US010505999B2

(12) United States Patent
Hyodo et al.

(10) Patent No.: US 10,505,999 B2
(45) Date of Patent: Dec. 10, 2019

(54) DISPLAY CONTROL APPARATUS, DISPLAY CONTROL METHOD, PROGRAM, AND COMMUNICATION SYSTEM

(71) Applicant: SONY CORPORATION, Tokyo (JP)

(72) Inventors: Katsuya Hyodo, Kanagawa (JP); Shuichi Konami, Chiba (JP); Tomoya Narita, Kanagawa (JP); Akemi Tazaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 158 days.

(21) Appl. No.: 15/856,517

(22) Filed: Dec. 28, 2017

(65) Prior Publication Data

US 2018/0124134 A1    May 3, 2018

Related U.S. Application Data

(63) Continuation of application No. 14/408,320, filed as application No. PCT/JP2013/068320 on Jul. 4, 2013, now Pat. No. 9,876,829.

(30) Foreign Application Priority Data

Jul. 12, 2012 (JP) ................................ 2012-156197

(51) Int. Cl.
*G06F 3/0484* (2013.01)
*H04L 29/06* (2006.01)
*G06F 3/14* (2006.01)
*G06F 17/24* (2006.01)

(52) U.S. Cl.
CPC .......... *H04L 65/403* (2013.01); *G06F 3/0484* (2013.01); *G06F 3/04842* (2013.01); *G06F 3/1415* (2013.01); *G06F 3/1454* (2013.01); *G06F 17/24* (2013.01); *G06F 2203/04803* (2013.01); *G09G 2370/022* (2013.01)

(58) Field of Classification Search
CPC .......................... G06F 3/04842; H04L 65/403
USPC ........................................................ 715/753
See application file for complete search history.

(56) References Cited

U.S. PATENT DOCUMENTS

| | | |
|---|---|---|
| 5,727,950 A | 3/1998 | Cook et al. |
| 5,745,711 A | 4/1998 | Kitahara et al. |
| 5,772,446 A | 6/1998 | Rosen |
| 6,078,948 A | 6/2000 | Podgorny et al. |
| 6,125,358 A | 9/2000 | Hubbell et al. |
| 6,341,960 B1 | 1/2002 | Frasson et al. |

(Continued)

FOREIGN PATENT DOCUMENTS

| | | |
|---|---|---|
| JP | 2000-020508 A | 1/2000 |
| JP | 2006-262230 A | 9/2006 |
| JP | 2010-033128 A | 2/2010 |

*Primary Examiner* — William D Titcomb
(74) *Attorney, Agent, or Firm* — Paratus Law Group, PLLC

(57) ABSTRACT

There is provided a display control apparatus including an acquisition section configured to acquire display information for displaying a state of collaborative editing in which a plurality of editors collaboratively edit a same editing target, and a display control section configured to cause an editing screen to display, based on the display information, the state of the collaborative editing performed on a not displayed part not included in a display range displayed when the editing target is displayed on the editing screen referenced to by a first editor among the plurality of editors.

27 Claims, 25 Drawing Sheets

(56) References Cited

U.S. PATENT DOCUMENTS

| | | |
|---|---|---|
| 6,411,796 B1 | 6/2002 | Remschel |
| 6,496,851 B1 | 12/2002 | Morris et al. |
| 6,611,822 B1 | 8/2003 | Beams et al. |
| 7,047,279 B1 | 5/2006 | Beams et al. |
| 8,943,417 B2 | 1/2015 | Parker et al. |
| 9,609,032 B2 | 3/2017 | Cohen et al. |
| 9,876,829 B2 * | 1/2018 | Hyodo .................... G06F 17/24 |
| 2010/0138764 A1 | 6/2010 | Hatambeiki et al. |
| 2010/0174783 A1 * | 7/2010 | Zarom .................... G06F 9/526 |
| | | 709/205 |
| 2010/0302150 A1 * | 12/2010 | Shelton .................. G06F 17/24 |
| | | 345/158 |
| 2012/0084695 A1 | 4/2012 | Higgins et al. |
| 2013/0091205 A1 * | 4/2013 | Kotler ................. H04L 65/4015 |
| | | 709/204 |
| 2013/0110941 A1 * | 5/2013 | Lewis .................. G06F 3/0484 |
| | | 709/206 |
| 2013/0318589 A1 | 11/2013 | Ford et al. |
| 2014/0019881 A1 | 1/2014 | Narita et al. |
| 2014/0129645 A1 | 5/2014 | Mo |
| 2014/0172967 A1 | 6/2014 | Yeung et al. |
| 2015/0106750 A1 | 4/2015 | Konami et al. |
| 2015/0149404 A1 | 5/2015 | Lock et al. |
| 2015/0379294 A1 | 12/2015 | Cohen et al. |

* cited by examiner

FIG. 2

| FILE ID | DATA PORTION |
|---|---|
| 0000540 | DATA |

FIG. 4

| USER ID | VIEW FILE ID | VIEW RANGE | CARET POSITION | DATA BEING CURRENTLY INPUT | EDITING RANGE | EDITING TYPE |
|---------|--------------|------------|----------------|----------------------------|---------------|--------------|
| A002 | 0000540 | 25-75 | 50, 10 | HEL | 48-51 | COLLABORATION |

FIG. 5

| ID OF USER NOT READING | FILE ID | TARGET LINE | CHANGE AMOUNT | CHANGER ID |
|---|---|---|---|---|
| A002 | 00000540 | 48 | 34 | A003 |
| A002 | 00000541 | 90 | 40 | A004 |

DISPLAY CONTROL APPARATUS, DISPLAY CONTROL METHOD, PROGRAM, AND COMMUNICATION SYSTEM

CROSS REFERENCE TO PRIOR APPLICATION

This application is a continuation of U.S. patent application Ser. No. 14/408,320 (filed on Dec. 16, 2014), which is a National Stage Patent Application of PCT International Patent Application No. PCT/JP2013/068320 (filed on Jul. 4, 2013) under 35 U.S.C. § 371, which claims priority to Japanese Patent Application No. 2012-156197 (filed on Jul. 12, 2012), which are all hereby incorporated by reference in their entirety.

TECHNICAL FIELD

The present disclosure relates to a display control apparatus, a display control method, a program, and a communication system, and particularly relates to a display control apparatus, a display control method, a program, and a communication system which are designed to enhance a work efficiency of collaborative editing performed by a plurality of editors in such a manner as to collaboratively edit the same editing target such as a document.

BACKGROUND ART

There is Google Docs (registered trademark), for example, as an on-line tool for a plurality of users to collaboratively edit the same editing target through a network such as the Internet.

With Google Docs, a plurality of users (editors) manipulate terminals of the respective users, and thereby can collaboratively edit an editing target held in a server connected to the terminals through a network.

When using Google Docs, each user edits the editing target in the view range of the editing target displayed in the terminal that the user manipulates.

In use of Google Docs, a communication system including, for example, a plurality of terminals and a server communicating with the terminals through a network is used (see for example, Patent Literature 1).

CITATION LIST

Patent Literature

Patent Literature 1: JP 2006-262230A

SUMMARY OF INVENTION

Technical Problem

However, when a user uses Google Does, the terminal displays the state od editing performed on the editing target in the view range, but does not display the state of editing performed in a not displayed part that is not included in the view range.

For this reason, it is not possible for the user to know easily the state of editing performed in the not displayed part, and thus the work efficiency of the collaborative editing is low.

The present disclosure has been made in view of such circumstances and makes it possible to enhance the work efficiency of the collaborative editing.

Solution to Problem

According to a first aspect of the present disclosure, there is provided a display control apparatus including an acquisition section configured to acquire display information for displaying a state of collaborative editing in which a plurality of editors collaboratively edit a same editing target, and a display control section configured to cause an editing screen to display, based on the display information, the state of the collaborative editing performed on a not displayed part not included in a display range displayed when the editing target is displayed on the editing screen referenced to by a first editor among the plurality of editors.

The display control section may cause the editing screen to display, based on the display information, a change amount representing an amount of change of the not displayed part owing to the collaborative editing.

The display control section may cause the editing screen to display, based on the display information, a type of the collaborative editing performed on the not displayed part.

The display control section may cause the editing screen to display, based on the display information, an unread display representing a part of the editing target that is not included in the display range.

The display control section may also cause, based on the display information, the state of the collaborative editing performed on the editing target within the display range to be displayed.

According to the first aspect of the present disclosure, there is provided a display control method of a display control apparatus that displays an image, the display control method including acquiring, by the display control apparatus, display information for displaying a state of collaborative editing in which a plurality of editors collaboratively edit a same editing target, and causing, by the display control apparatus, an editing screen to display, based on the display information, the state of the collaborative editing performed on a not displayed part not included in a display range displayed when the editing target is displayed on the editing screen referenced to by a first editor among the plurality of editors.

According to the first aspect of the present disclosure, there is provided a program for causing a computer to function as an acquisition section configured to acquire display information for displaying a state of collaborative editing in which a plurality of editors collaboratively edit a same editing target, and a display control section configured to cause an editing screen to display, based on the display information, the state of the collaborative editing performed on a not displayed part not included in a display range displayed when the editing target is displayed on the editing screen referenced to by a first editor among the plurality of editors.

According to the first aspect of the present disclosure, display information for displaying a state of collaborative editing in which a plurality of editors collaboratively edit a same editing target is acquired, and based on the display information, on an editing screen is displayed the state of the collaborative editing performed on a not displayed part not included in a display range displayed when the editing target is displayed on the editing screen referenced to by a first editor among the plurality of editors.

According to a second aspect of the present disclosure, there is provided a communication system including a plurality of communication terminals manipulated by a plurality of respective editors, and a server apparatus that communicates with the plurality of communication terminals through a network.

The server apparatus includes a first acquisition section configured to generate and thereby acquire display information for displaying a state of collaborative editing in which the plurality of editors collaboratively edit a same editing target, and a first display control section configured to control display of each of the communication terminals by transmitting the display information to the communication terminal.

Each of the communication terminals includes a second acquisition section configured to receive and thereby acquire the display information supplied from the server apparatus, and a second display control section configured to cause an editing screen to display, based on the acquired display information, the state of the collaborative editing performed on a not displayed part not included in a display range displayed when the editing target is displayed on the editing screen referenced to by a first editor among the plurality of editors.

According to the second embodiment of the present disclosure, the display information for displaying the state of collaborative editing in which a plurality of editors collaboratively edit the same editing target is generated and thereby acquired by the server apparatus, and the display information is transmitted to the communication terminals, thereby the display of the communication terminals is controlled. In addition, the display information supplied from the server apparatus is received and thereby acquired by each of the communication terminals, and based on the acquired display information, the state of the collaborative editing on the not displayed part not included in the display range displayed when the editing target is displayed on the editing screen referenced by the first editor is displayed on the editing screen.

Advantageous Effects of Invention

According to the present disclosure, it is possible to enhance the work efficiency of collaborative work.

BRIEF DESCRIPTION OF DRAWINGS

FIG. 2 is a diagram illustrating an example of an editing target held in a server.

FIG. 4 is a diagram illustrating an example of user information held as state information in a server.

FIG. 5 is a diagram illustrating an example of unread information held as state information in a server.

DESCRIPTION OF EMBODIMENTS

Hereinafter, embodiments of the present disclosure (hereinafter referred to as embodiments) will be described. Note that the description is given in the following order.

1. First embodiment (an example of displaying the state of editing performed in a not displayed part that is not included in a view range)

2. Second embodiment (an example of displaying not only a manipulation GUI of a user but also manipulation GUIs of other users)

3. Third embodiment (an example of editing on an object basis)

1. First Embodiment

[Configuration Example of Communication System 1]

Figure 1:
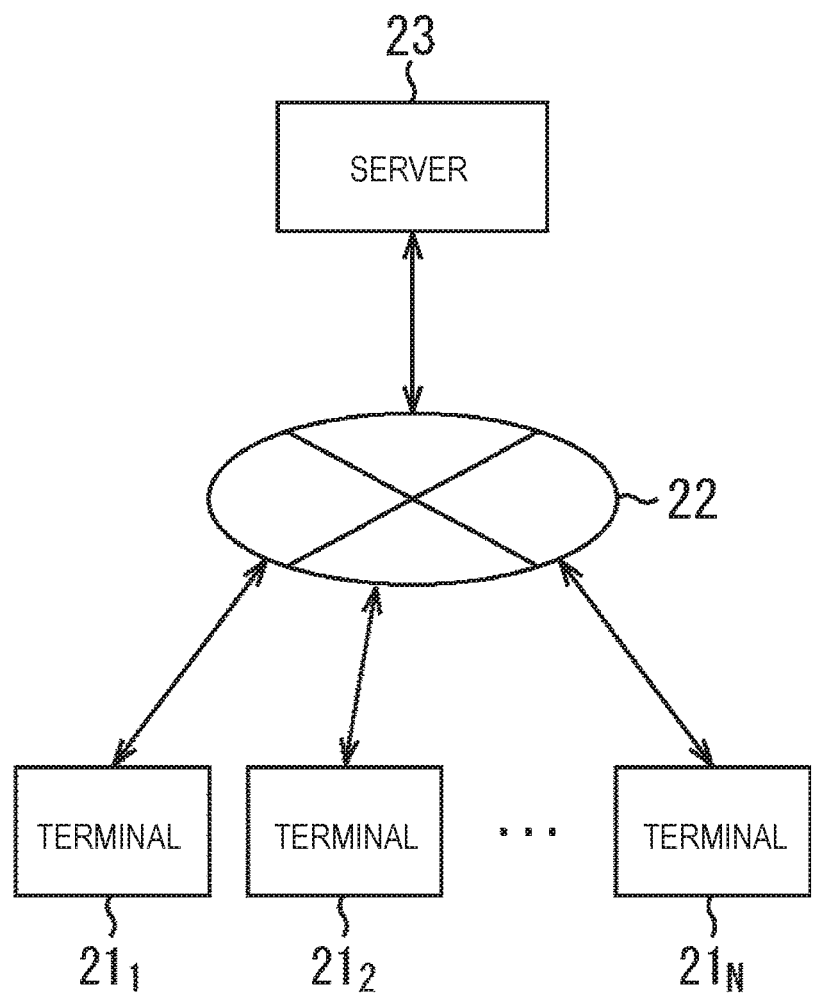
FIG. 1 is a block diagram illustrating a configuration example of a communication system to which the present technology is applied.

FIG. 1 illustrates a configuration example of a communication system 1 to which the present technology is applied.

The communication system 1 includes a plurality of terminals $21_1$ to $21_N$ which are manipulated by a respective plurality of users (editors), a network 22 such as the Internet or LAN (Local Area Network), and a server 23.

Note that the communication system 1 is used, for example, when the plurality of users perform collaborative editing, that is, collaborate to edit one editing target held in the server 23 through the network 22.

Here, an editing target is a file (data) to be edited collaboratively. As the editing target, for example, a document, a spread sheet (a table formed by rows and columns), a material for presentation, graphics, an image, a moving image, sound data, or the like may be employed.

Hereinbelow, the description is given on the assumption that the editing target is a document for convenience of the description. Data structure of the editing target will be described in detail with reference to FIG. 2.

By manipulating a terminal $21_n$ (n=1, 2, ..., N), a user thereof causes the terminal $21_n$ to execute a collaborative editing application for collaboratively editing the editing target held in the server 23 through the network 22 in collaboration with a user of another terminal $21_m$ (n≠m).

Thus, in response to the execution of the collaborative editing application, the terminal $21_n$ thereby requests, through the network 22, the server 23 for display information for displaying an editing window to be referred to by the user of the terminal $21_n$ in collaboratively editing the editing target.

The terminal $21_n$ displays the editing window based on the display information supplied from the server 23 through the network 22 in response to the request for the display information.

The editing window displays not only the state of editing by the user of the terminal $21_n$ but also the state of editing by the user of the other terminal $21_m$. Note that the display in the editing window is the point of the present disclosure, and thus examples of displays in the editing window will be described in detail with reference to FIGS. 6, 7, 9, and 10 and the like to be described later.

Further, based on editing manipulation performed by the user of the terminal $21_n$ while referring to the editing window, the terminal $21_n$ generates update information for updating the editing target and state information which are held in the server 23, and supplies the server 23 with the update information through the network 22.

Note that the state information indicates the state (condition) of editing performed on the editing target, and is used when the server 23 generates display information.

As the state information, for example, user information including a caret (cursor) position and the like changing in accordance with the user editing manipulation, unread information including an editing point and the like yet to be checked by the user, and the like may be employed.

Figure 6:
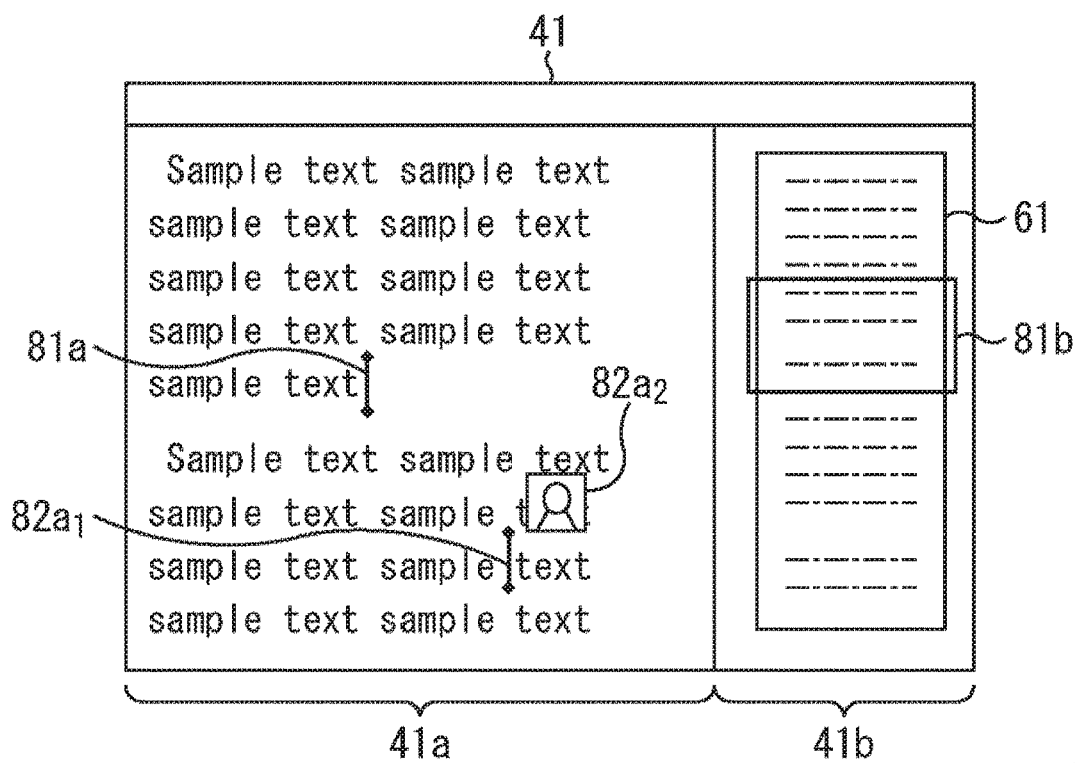
FIG. 6 is a second diagram illustrating an example of an editing window displayed in a terminal.
Figure 7:
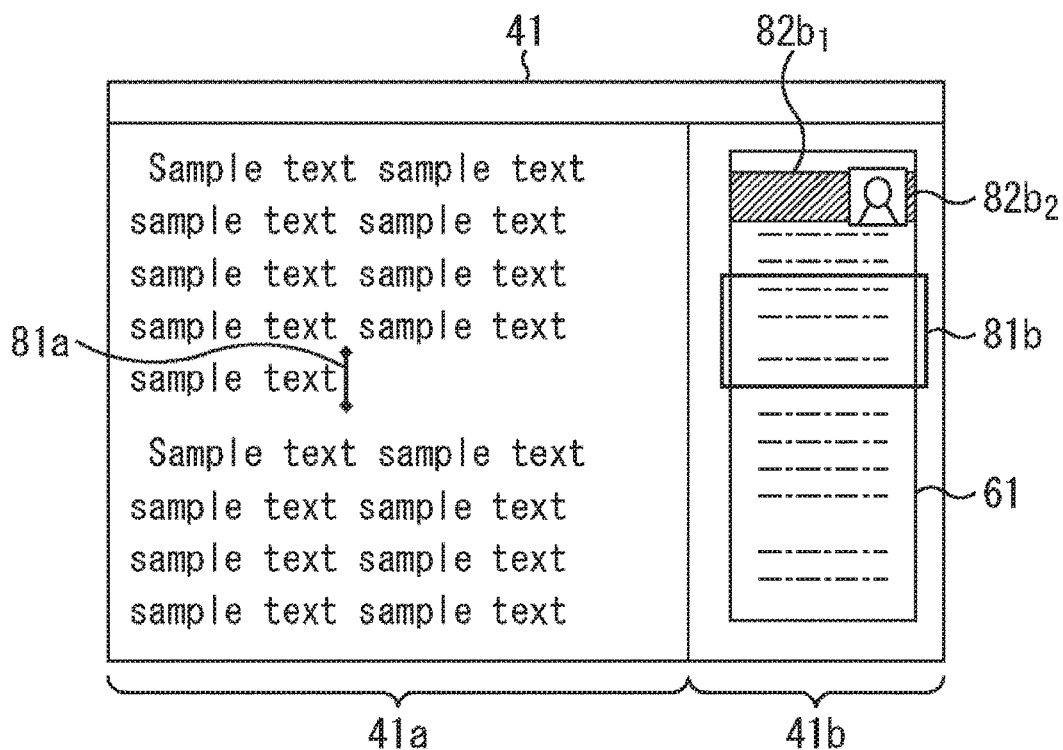
FIG. 7 is a third diagram illustrating an example of an editing window displayed in a terminal.

The user information will be described in detail with reference to FIGS. 3 and 4. When the user information is used as the state information, editing windows as illustrated in FIGS. 6 and 7 are displayed in the terminal $21_n$.

Figure 9:
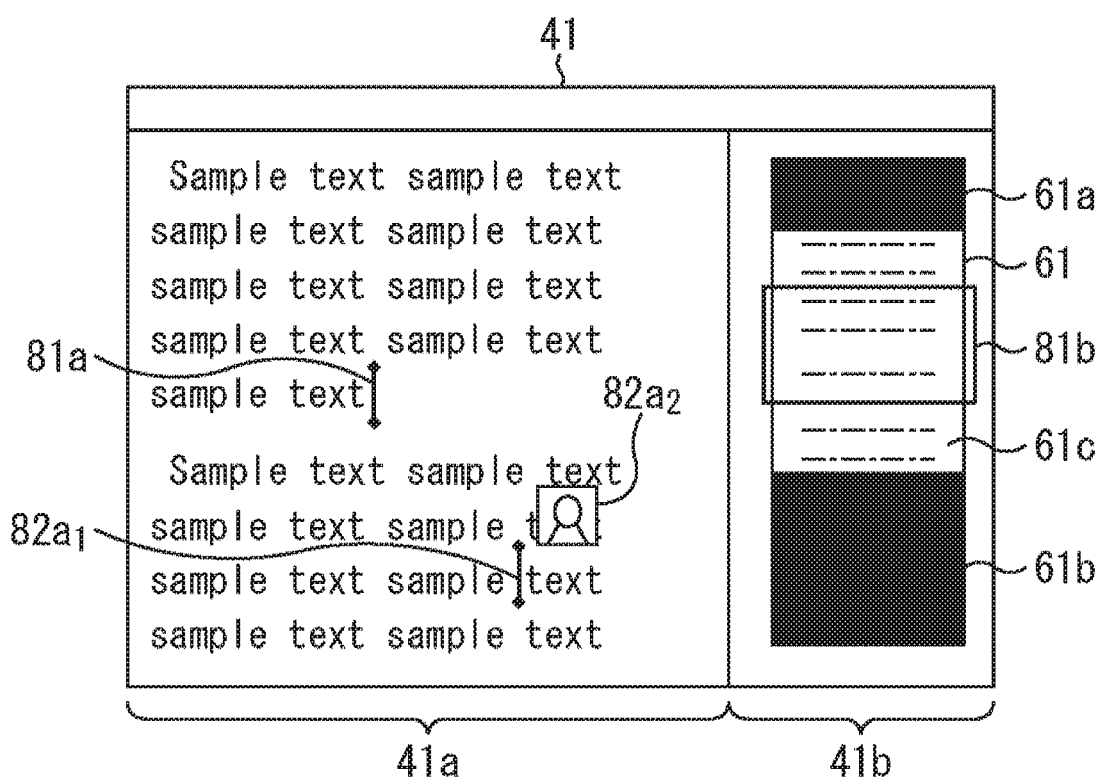
FIG. 9 is a fourth diagram illustrating an example of an editing window displayed in a terminal.
Figure 10:
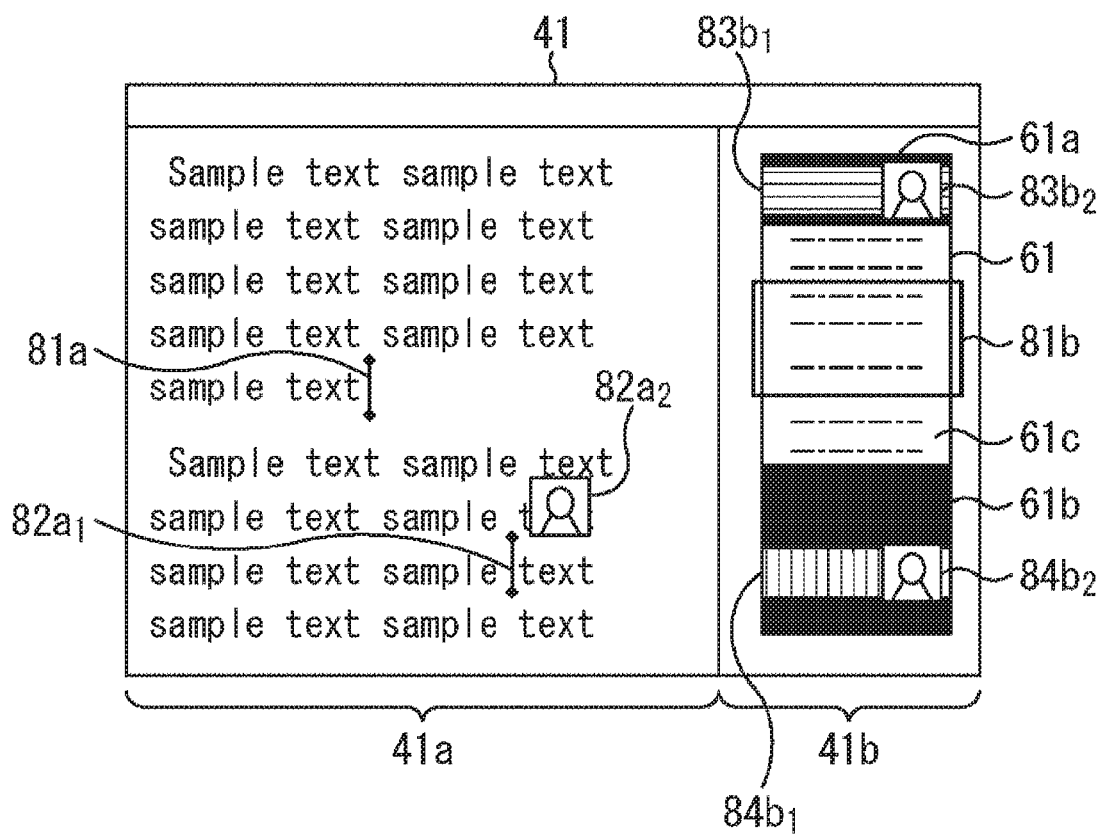
FIG. 10 is a fifth diagram illustrating an example of an editing window displayed in a terminal.

The unread information will be described in detail with reference to FIG. 5. When the user information and the unread information are used as the state information, editing windows as illustrated in FIGS. 9 and 10 are displayed in the terminal $21_n$.

In addition, not only the user information and the unread information but also manipulation GUI information and the like may be employed as the state information, the manipulation GUI information including the position of a manipulation GUI (graphical user interface) which is manipulated in editing the editing target and displays the content of the editing.

Figure 17:
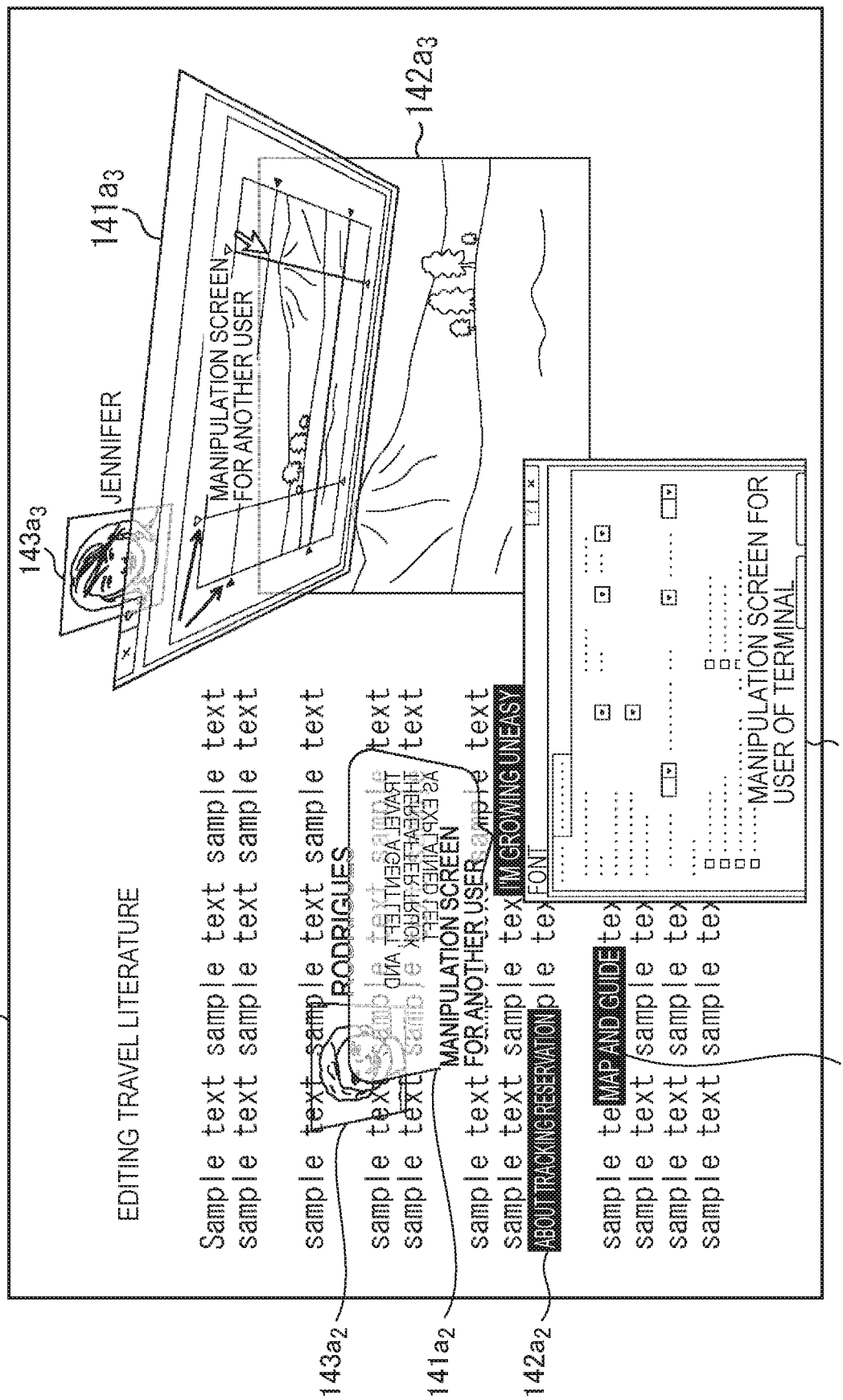
FIG. 17 is a first diagram illustrating an example of a user's own view displayed in a terminal.
Figure 18:
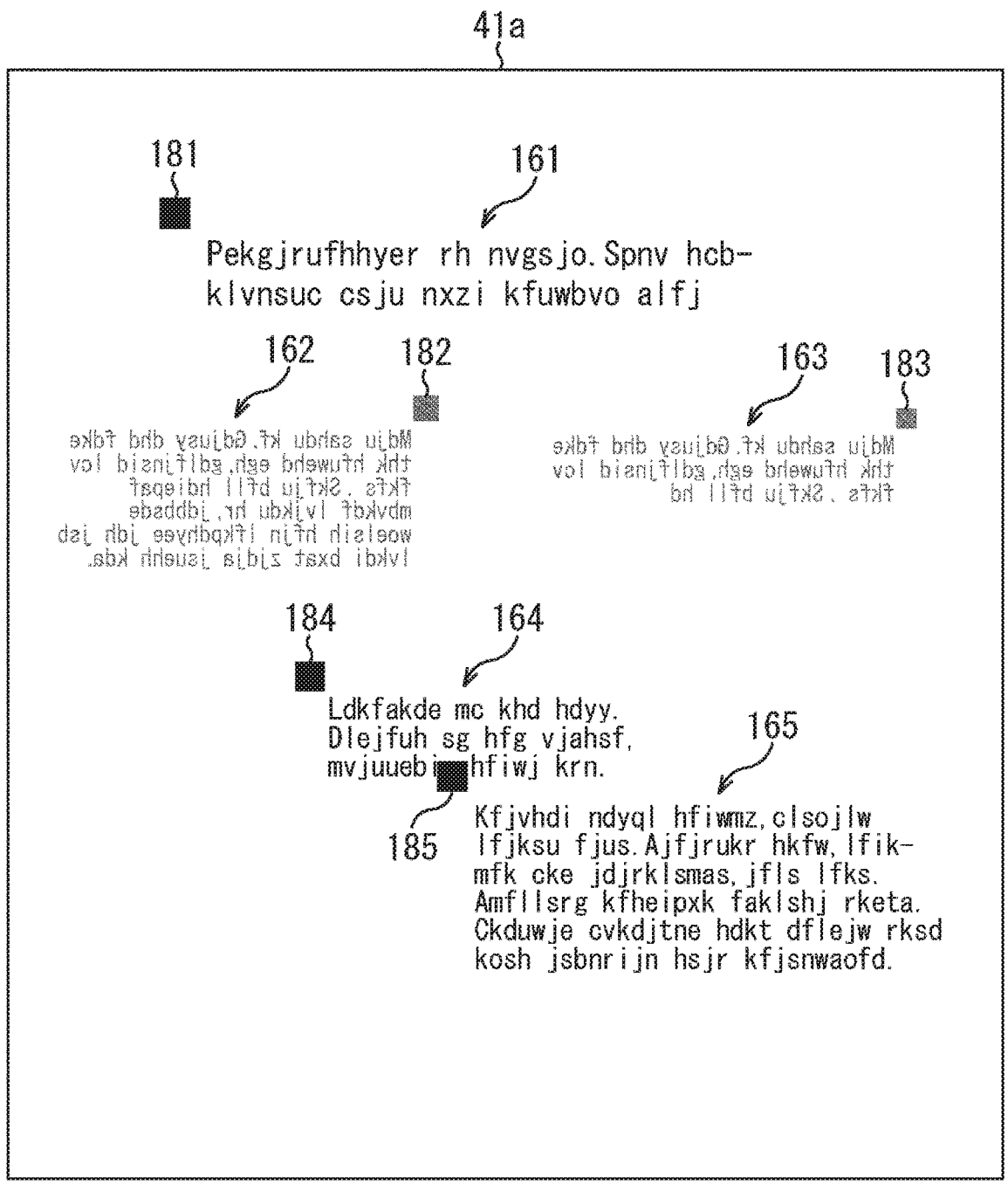
FIG. 18 is a second diagram illustrating an example of a user's own view displayed in a terminal.

When the user information, the unread information, and the manipulation GUI information are employed as the state information, editing windows as illustrated in FIGS. 17 and 18 are displayed in the terminal $21_n$.

Further, the state information is not limited to the user information, the unread information, and the manipulation GUI information. For example, history information and the like may be employed, the history information indicating a history of editing the editing target. The case of using the history information as the state information will be described in detail with reference to FIGS. 18 to 26.

That is, the communication system 1 may display various editing windows in the terminal $21_n$ according to a combination of the state information and the update information.

The server 23 receives the update information from the terminal $21_n$ through the network 22, and updates the editing target and the state information held in a not shown built-in storage section, based on the received update information.

The server 23 also generates the display information addressed to the terminal $21_n$ based on the editing target and the state information. Then, through the network 22, the server 23 supplies the terminal $21_n$ with the display information addressed to the terminal $21_n$ to thereby control display in the editing window of the terminal $21_n$.

Although the description will be given below on the assumption that the communication system 1 includes the plurality of terminals $21_1$ to $21_N$, the network 22, and the server 23, the terminal $21_n$ which is one of the plurality of the terminals $21_1$ to $21_N$ may be configured to have the same function as that of the server 23. In this case, the terminal $21_n$ also serves as the server 23, and thus the server 23 may be omitted.

Figure 2:
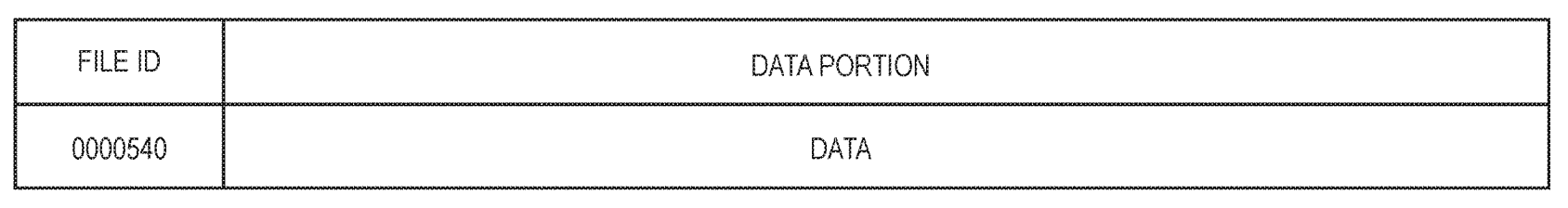

Next, FIG. 2 illustrates an example of an editing target held in the server 23.

The editing target (or data indicating the editing target) is held in the server 23, for example, in association with a file ID ("0000540" in FIG. 2) for identifying the editing target, as illustrated in FIG. 2.

Note that the server 23 generates the editing target, for example, in response to the request from the terminal $21_n$ and holds the editing target in the built-in storage section. Then, the server 23 updates the held editing target based on the update information from the terminal $21_n$.

In other words, for example, the user performs the editing manipulation for editing the editing target on the terminal $21_n$.

In this case, the terminal $21_n$ generates update information including a user ID for identifying the user of the terminal $21_n$ a file ID for identifying the editing target, and the content of the editing of the editing target, based on the editing manipulation of the user, and supplies the server 23 with the update information through the network 22.

Note that the terminal $21_n$ in advance holds the user ID in a not shown built-in memory. Further, for example, the terminal $21_n$ receives the file ID of the editing target from the server 23 through the network 22 at the time of executing the collaborative editing application, and holds the file ID in the not shown built-in memory.

The server 23 updates the editing target to have the editing content included in the update information supplied from the terminal $21_n$ the editing target being a file identified by the file ID also included in the update information among files held in the not shown storage section.

Figure 3:
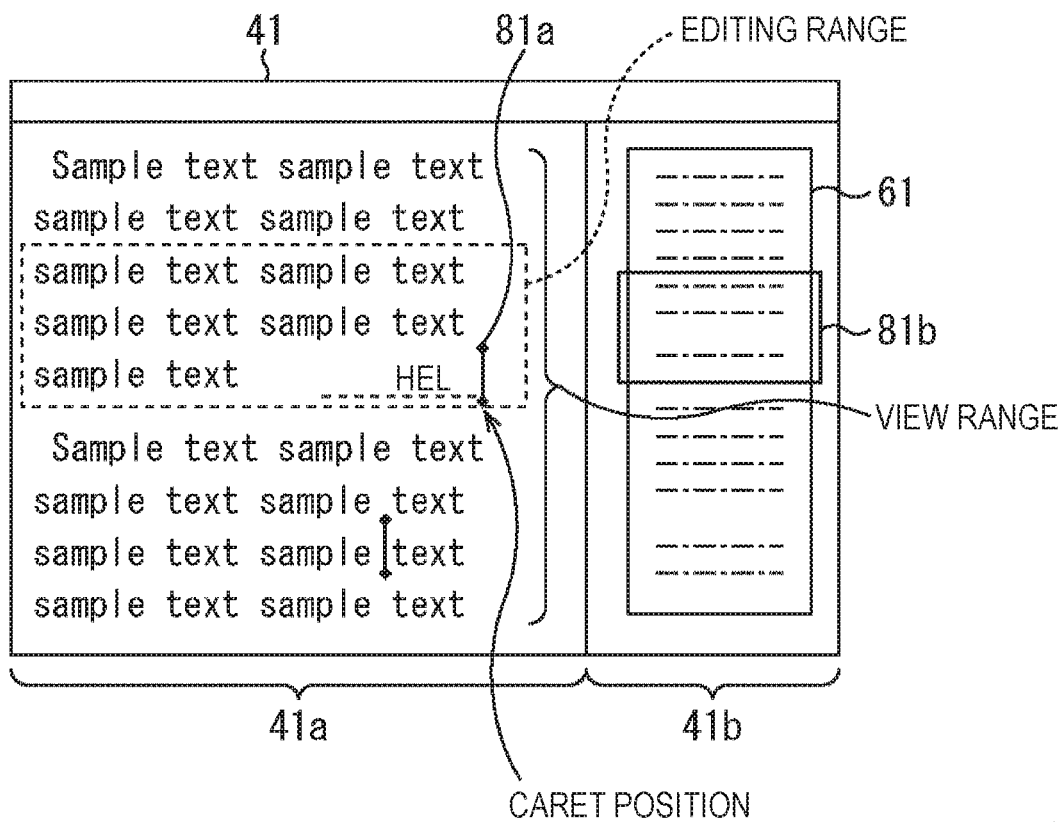
FIG. 3 is a first diagram illustrating an example of an editing window displayed in a terminal.

Next, FIG. 3 illustrates an example of an editing window 41 displayed in the terminal $21_n$.

Note that, for convenience of the description, FIG. 3 only illustrates the state of editing by the user of the terminal $21_n$. However, actually, the editing window 41 displays the state of editing not only by the user of the user of the terminal $21_n$ but also by the user of the other terminal $21_m$. Examples of the actual displays in the editing window 41 will be described by using FIGS. 6, 7, 9, 10, and the like.

The editing window 41 includes a user's own view 41a and an entire view 41b. Note that the editing window 41 may display only either the user's own view 41a or the entire view 41b in accordance with the manipulation by the user of the terminal $21_n$ for example.

The user's own view 41a is a screen to which the user himself/herself (the user of the terminal $21_n$) refers in editing, and displays, for example, "sample text . . . " as characters included in a document of the editing target.

The entire view 42b is a screen on which the document which is the editing target is displayed as a whole, and displays, for example, an entire thumbnail 61 which is an overall view of the document. The entire view 42b also displays a frame 81b surrounding a part of the entire thumbnail 61 and corresponding to a view range (display range) of the document displayed in the user's own view 41a.

For example, by manipulating the terminal $21_n$ the user thereof causes the terminal $21_n$ to execute the collaborative editing application to set a certain file (such as a document) as an editing target.

In this way, the terminal $21_n$ displays the editing window 41 as illustrated in FIG. 3.

For example, by manipulating the terminal $21_n$, the user designates an editing range (range surrounded by a dotted line in FIG. 3) representing a range to be edited in the view range of the user's own view 41a.

In addition, for example, by manipulating the terminal $21_n$ the user selects either "collaboration" or "exclusion" as a type of the editing range. In "collaboration", the user edits the editing target in collaboration with another user (for example, a user of the terminal $21_m$). In "exclusion", only the user exclusively edits the editing target. Note that the editing types will be described in detail with reference to FIG. 8.

Then, the user starts inputting characters at a position designated by a caret (cursor) 81a in the designated editing range. In FIG. 2, the user's own view 41a displays "Hel" which is a text string being currently input.

The terminal $21_n$ generates update information in accordance with user manipulation of the terminal $21_n$ and supplies the server 23 with the update information through the network 22.

Next, FIG. 4 illustrates an example of the user information held as the state information in the server 23.

The user information includes a user ID representing the user of the terminal $21_n$ a view file ID representing a file currently displayed in a view range, a view range viewed by the user, a caret position representing the position of the caret 81a used by the user, data being currently input representing data being currently input by the user, editing range representing a range of editing by the user, and an editing type.

For example, the user refers to the editing window 41 as illustrated in FIG. 3 to perform editing manipulation such as moving the caret 81a. In this case, in accordance with the editing manipulation by the user, the terminal $21_n$ generates update information for updating the caret position of the caret 81a to the caret position resulting from the moving in accordance with the editing manipulation by the user.

Then, the terminal $21_n$ supplies the server 23 through the network 22 with the update information generated in accordance with the editing manipulation by the user.

Based on the update information supplied from the terminal $21_n$ through the network 22, the server 23 updates the user information held therein as the state information of the terminal $21_n$.

Specifically, the terminal $21_n$ generates the update information including, for example, a user ID "A002", a file ID "0000540", a view range "25-75" after the user's editing manipulation, a caret position "50, 10", data "Hel" being currently input, an editing range "48-51", and the editing type "collaboration".

Note that the view range "25-75" indicates that a part from the 25th line to the 75th line of the document which is the editing target is set as the view range. The caret position "50, 10" indicates that the caret 81a is present at a position in the 50th line and the 10th column of the document. Further, the editing range "48-51" indicates that a part from the 48th line to the 51st line of the document is set as the editing range.

The terminal $21_n$ supplies the server 23 with the generated update information through the network 22.

The server 23 extracts the user ID "A002" and the file ID "0000540" from the update information supplied from the terminal $21_n$ through the network 22. The server 23 reads out user information including the thus extracted user ID and the file ID from the not shown built-in storage section.

The server 23 then compares the read out user information with the update information from the terminal $21_n$, changes the read out user information based on the comparison result, supplies the not shown built-in storage section with the changed user information, and stores the user information therein in an overwrite manner.

Specifically, suppose a case where, for example, the user information read out by the server 23 includes the user ID "A002", the file ID "0000540", the view range "25-75", a caret position "50, 9", the data "Hel" being currently input, the editing range "48-51", and the editing type "collaboration".

In addition, for example, the update information supplied from the terminal $21_n$ to the server 23 includes the user ID "A002", the file ID "0000540", the view range "25-75", the caret position "50, 10", the data "Hel" being currently input, the editing range "48-51", and the editing type "collaboration".

In this case, the user information read out by the server 23 and the update information supplied from the terminal $21_n$ to the server 23 are different from each other only in the caret position, and are the same in the other items.

The server 23 detects the item "caret position" different between the read out user information and the update information supplied from the terminal $21_n$ through the network 22, and changes the detected item "caret position" from "50, 9" to "50, 10".

Then, the server 23 supplies the not shown built-in storage section with the user information including the changed caret position, and stores the user information therein in the overwrite manner.

Based on the changed user information, the server 23 also updates unread information also held in the built-in storage section.

Next, FIG. 5 illustrates an example of the unread information held in the server 23 as the state information.

As illustrated in FIG. 5, the unread information includes a user ID representing a user who has not read an editing target, a file ID representing an unread file, a target line representing a line edited by a different user, a change amount representing an amount of change due to editing by the different user, and a changer ID representing the different user who changes the target line by the change amount.

In FIG. 5, an unread information piece displayed in the first row includes a user ID "A002", a file ID "0000540", a target line "48", a change amount "34", and a changer ID "A003".

In addition, an unread information piece displayed in the second row includes a user ID "A002", a file ID "0000541", a target line "90", a change amount "40", and a changer ID "A004".

For example, the unread information piece displayed in the first row indicates that a different user identified by the changer ID "A003" changes the 48th line in an editing target (for example, a document) identified by the file ID "0000540" by the change amount "34".

In this case, the change amount may be, for example, the number of characters changed due to the editing by the different user.

The unread information piece displayed in the first row also indicates that a user identified by the user ID "A002" has not viewed (not read) a changed part changed by the different user shown by the changer ID "A003". These hold true for the unread information piece displayed in the second row.

After updating the editing target and the state information (for example, the user information and the unread information) based on the update information from the terminal $21_n$ supplied through the network 22, the server 23 generates display information addressed to at least one target terminal to which the display information should be transmitted, based on the updated editing target and the state information. Then, the server 23 supplies the target terminal through the network 22 with the display information addressed to the target terminal.

Note that the server 23 determines a target terminal based on, for example, update information from a terminal $21_n$ and user information stored in the not shown built-in storage section.

Specifically, for example, when the server 23 updates the file ID included in user information based on update information from a terminal $21_n$, that is, when the user changes an editing target, the server 23 determines, as a target terminal, a terminal $21_n$ of any user who views a file shown by a file ID before or after the change.

In addition, for example, when updating a view range included in user information or unread information based on update information from a terminal $21_n$, the server 23 determines, as a target terminal, the terminal $21_n$ having transmitted the update information.

Further, for example, when updating a caret position or data being currently input included in user information based on update information from a terminal $21_n$, the server 23 determines, as a target terminal, any terminal $21_n$ having the user's own view 41a which is changed according to the change of the caret position of the caret 81a.

In other words, among terminals $21_n$ of users viewing a file represented by a file ID included in the update information from the terminals $21_n$, the server 23 determines, as target terminals, the terminals $21_n$ of the following users: any user who moves the caret 81a within or into the view range; and any user who moves the caret 81a out of the view range.

Moreover, for example, when updating an editing range or an editing type included in user information, or the content of an editing target based on update information from a terminal $21_n$ the server 23 determines, as a target terminal, a terminal $21_n$ of any user viewing the editing target.

[Example of Case where Caret of User B is Displayed in User's Own View 41a of User A]

FIG. 6 illustrates an example of the editing window 41 displayed in a terminal $21_n$ of a user A when a user B edits an editing target in a view range of the user A.

For convenience of the description, the description is given with reference to FIG. 6 on the assumption that only the user A and the user B perform the collaborative editing. This holds true for description to be given later with reference to FIGS. 7 to 9.

As illustrated in FIG. 6, the caret 81a of the user A, a caret $82a_1$ of the user B, and a thumbnail $82a_2$ representing the face of the user B near the caret $82a_1$ are displayed in the user's own view 41a of the user A.

Note that not only the face of the user B but also, for example, an avatar or a portrait of the user B may be employed as the thumbnail $82a_2$. In other words, the thumbnail $82a_2$ may be any display, as long as the display can uniquely identify the user B.

Based on, for example, the update information from the terminal $21_n$ of the user A and the update information from the terminal $21_m$ of the user B, the server 23 updates an editing target and state information which are held therein. Then, the server 23 generates display information for displaying the editing window 41 as illustrated in FIG. 6 based on the updated editing target and state information, and supplies the terminal $21_n$ with the display information through the network 22.

The terminal $21_n$ displays the editing window 41 as illustrated in FIG. 6, based on the display information supplied from the server 23 through the network 22.

Note that in FIG. 6, a caret position of user information of the user B is included in a view range of user information of the user A as state information.

When, for example, the caret position of the user information of the user B is not included in the view range of the user information of the user A as the state information, the terminal $21_n$ displays the editing window 41 as illustrated in FIG. 7 based on the display information supplied from the server 23 through the network.

[Example of Case where View Range or the Like of Different User B is Displayed in Entire View 41b of User A]

Next, FIG. 7 illustrates an example of the editing window 41 displayed in the terminal $21_n$ of the user A when the caret of the user B is present beyond the view range of the user A.

In FIG. 7, only the caret 81a of the user A is displayed in the user's own view 41a of the user A. This is because the caret of the user B is not included in the view range of the user A.

In addition, the frame 81b showing the view range of the user A and a strip display $82b_1$ showing the editing range of the user B are displayed in the entire view 41b of the user A, as illustrated in FIG. 7. On the strip display $82b_1$, for example, a thumbnail $82b_2$ (like the thumbnail $82a_2$) of the user B is displayed.

Note that in FIG. 7, a range occupied by the strip display $82b_1$ is the editing range of the user B, but may be a view range of the user B.

The strip display $82b_1$ may also show not only the editing range of the user B but also the type of the editing by the user B.

[Editing Types]

Figure 8:
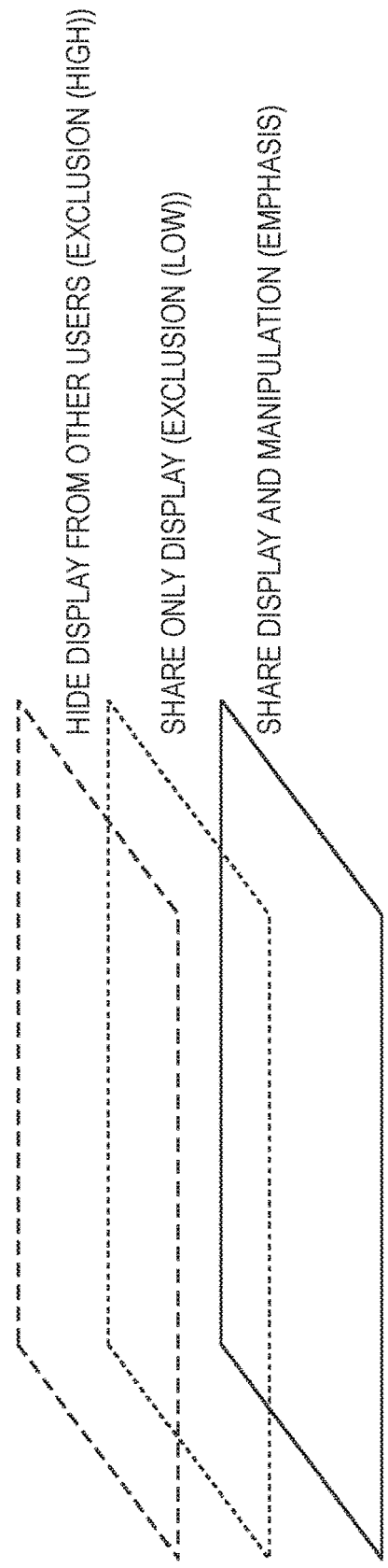
FIG. 8 is a diagram illustrating an example of editing types.

Next, FIG. 8 illustrates an example of the editing types.

As illustrated in FIG. 8, examples of the editing types include "exclusion (high)", "exclusion (low)", and "collaboration" arranged in order of the degree of exclusive editing, from the highest degree.

The type "exclusion (high)" means that the user B edits an editing range in a state where the user B does not share the editing in the editing range of the user B with the user A, and the editing range is hidden from the user A.

In "exclusion (high)", only the user B can view his/her own editing range through the user's own view 41*a* of the user B and edit the editing target.

Accordingly, even if, for example, the user A attempts to display the editing range of the user B in the user's own view 41*a* of the user A, the state of editing by the user B (for example, the caret of the user B or the editing content) is not displayed, and only display indicating that the user B is currently editing the editing target is shown.

The type "exclusion (low)" means that the user B edits the editing range in a state where the user B shares the editing in the editing range of the user B with the user A.

In "exclusion (low)", not only the user B but also the user A can view the editing range of the user B through the respective user's own views 41*a*, but only the user B can edit the editing range of the user B.

Accordingly, for example, the user A can view the state of editing by the user B through the user's own view 41*a* of the user A by displaying the editing range of the user B in the user's own view 41*a* of the user A. However, it is not possible for the user A to edit the editing range of the user B.

The type "collaboration" means that the editing range is edited in a state where the user B shares the display and manipulation of the editing range of the user B with the user A.

In "collaboration", the user A in addition to the user B can view the editing range of the user B through the respective user's own views 41*a*, and can edit the editing range of the user B.

Note that the editing type is in advance set as, for example, "collaboration", and may be configured so as to be changed by the manipulation of the terminal 21*m* by the user B. This holds true for any of the terminals 21$_1$ to 21$_N$.

For example, when there are a plurality of editing types as illustrated in FIG. 8, it is possible to represent the editing type of the user B based on at least one of the color, the pattern, and the shape of the strip display 82*b*$_1$.

Note that the editing types are not limited to the three types illustrated in FIG. 8, and thus may be, for example, any two types or one type of "collaboration", "exclusion (low)", and "exclusion (high)".

Meanwhile, also based on, for example, the unread information of the user A, the server 23 may generate the display information for displaying the editing window 41 as illustrated in FIG. 9 to be described later.

[Example of Case where Unread Part of User a is Displayed in Entire View 41*b*]

FIG. 9 illustrates an example of the editing window 41 displaying, on the entire view 41*b*, unread parts which are parts yet to be read by the user A.

Note that in FIG. 9, the user's own view 41*a* has the same configuration as in FIG. 6.

As illustrated in FIG. 9, the entire view 41*b* of the user A displays the unread parts and a read part of the user A in the entire thumbnail 61 in a discriminatory manner.

Here, the unread part means a part which has not been displayed in the user's own view 41*a* of the user A, while the read part means a part which has already been displayed in the user's own view 41*a* of the user A.

Specifically, the entire view 41*b* displays, in the entire thumbnail 61, for example, unread parts 61*a* and 61*b* of the user A in black and a read part 61*c* of the user A in white.

When the user B edits the read part 61*c*, the read part 61*c* is displayed as an unread part of the user A.

In addition, for example, when being displayed in the user's own view 41*a*, the unread part 61*a* is displayed as a read part with the color of the unread part 61*a* changed from black to white.

Further, for example, the user's own view 41*a* displays an unread document (text strings) by using thick characters. Then, when the unread document is read after the elapse of a predetermined time from the display of the document, the user's own view 41*a* displays the characters in the document by using thin characters.

That is, for example, the user's own view 41*a* displays the unread document and the read document in the discriminatory manner.

As has been described with reference to FIG. 9, the entire view 41*b* displays the unread part of the user A, and the user A can easily know where the user A has not checked yet.

In addition, for example, when the user B edits the read part 61*c* in the entire view 41*b*, the read part 61*c* is displayed as an unread part of the user A. For this reason, the user A can perform the collaborative editing without overlooking the change in editing by the other user B.

[Example of Editing Window Displayed when Three or More Users Perform Collaborative Editing]

Next, FIG. 10 illustrates an example of the editing window 41 displayed when three or more users perform collaborative editing.

The editing window 41 illustrated in FIG. 10 shows an editing window of the terminal 21$_n$ of the user A displayed when, for example, a plurality of different users A, B, C, and D perform the collaborative editing.

Note that components in the editing window 41 illustrated in FIG. 10 which have the same configuration as those in FIG. 9 are denoted by the same reference signs, and thus descriptions thereof are hereinafter omitted appropriately.

As illustrated in FIG. 10, the entire view 41*b* of the user A displays a strip display 83*b*$_1$ of the user C and a thumbnail 83*b*$_2$ representing the user C in the unread part 61*a*.

In the strip display 83*b*$_1$, for example, a range occupied by the strip display 83*b*$_1$ in the entire thumbnail 61 shows an editing range of the user C.

The strip display 83*b*$_1$ has a horizontal line pattern, and the pattern shows that the editing type of the user C is "exclusion (low)".

Note that a message such as "I am puzzling my brains about the editing!" or "I will finish the editing by today" may be displayed on the strip display 83*b*$_1$.

The user A referencing to the entire view 41*b* in this way can easily know the degree of progress of the editing by, for example, the user C, as information on the state of editing by the user C. This holds true for the other strip displays (such as a strip display 84*b*$_1$ to be described later).

Further, in the strip display 83*b*$_1$, a larger number of added horizontal lines represent a larger change amount in the editing by the user C. That is, the number of added horizontal lines of the strip display 83*b*$_1$ represents the change amount of the user C.

Note that the change amount may be represented by the color or the shape of the strip display 83*b*$_1$. In other words, it is possible to represent the more or less of the change amount by using at least one of, for example, the pattern, the color, and the shape of the strip display 83*b*$_1$.

Specifically, for example, a larger change amount may be represented by a darker color of the strip display 83*b*$_1$, or the strip display 83*b*$_1$ may be shaped to extend in the right and left directions in the figure. This holds true for the strip display 84*b*$_1$ to be described later.

As illustrated in FIG. 10, the entire view 41b of the user A displays a strip display $84b_1$ of the user D and a thumbnail $84b_2$ representing the user D in the unread part 61b.

For example, a range occupied by the strip display $84b_1$ in the entire thumbnail 61 shows an editing range of the user D.

In addition, the strip display $84b_1$ has a vertical line pattern, and the pattern shows that the editing type of the user D is "collaboration".

Note that a message such as "Do collaborate with us!" or "I could collaborate with you." may be displayed on the strip display $84b_1$.

The user A referencing to the entire view 41b in this way can know in more detail how much, for example, the user D wishes to collaborate with the other users, as information on the state of editing by the user D.

Further, in the strip display $84b_1$, a larger number of added vertical lines represent a larger change amount in the editing by the user D. That is, the number of added vertical lines of the strip display $84b_1$ represents the change amount of the user D.

As has been described with reference to FIG. 10, the entire view 41b displays, for example, the strip displays $83b_1$ and $84b_1$ showing the editing types. This enables, for example, the user A referencing to the entire view 41b to know in real time the editing types in the editing by the users C and D other than the user A.

[Configuration Example of Terminal $21_n$]

Figure 11:
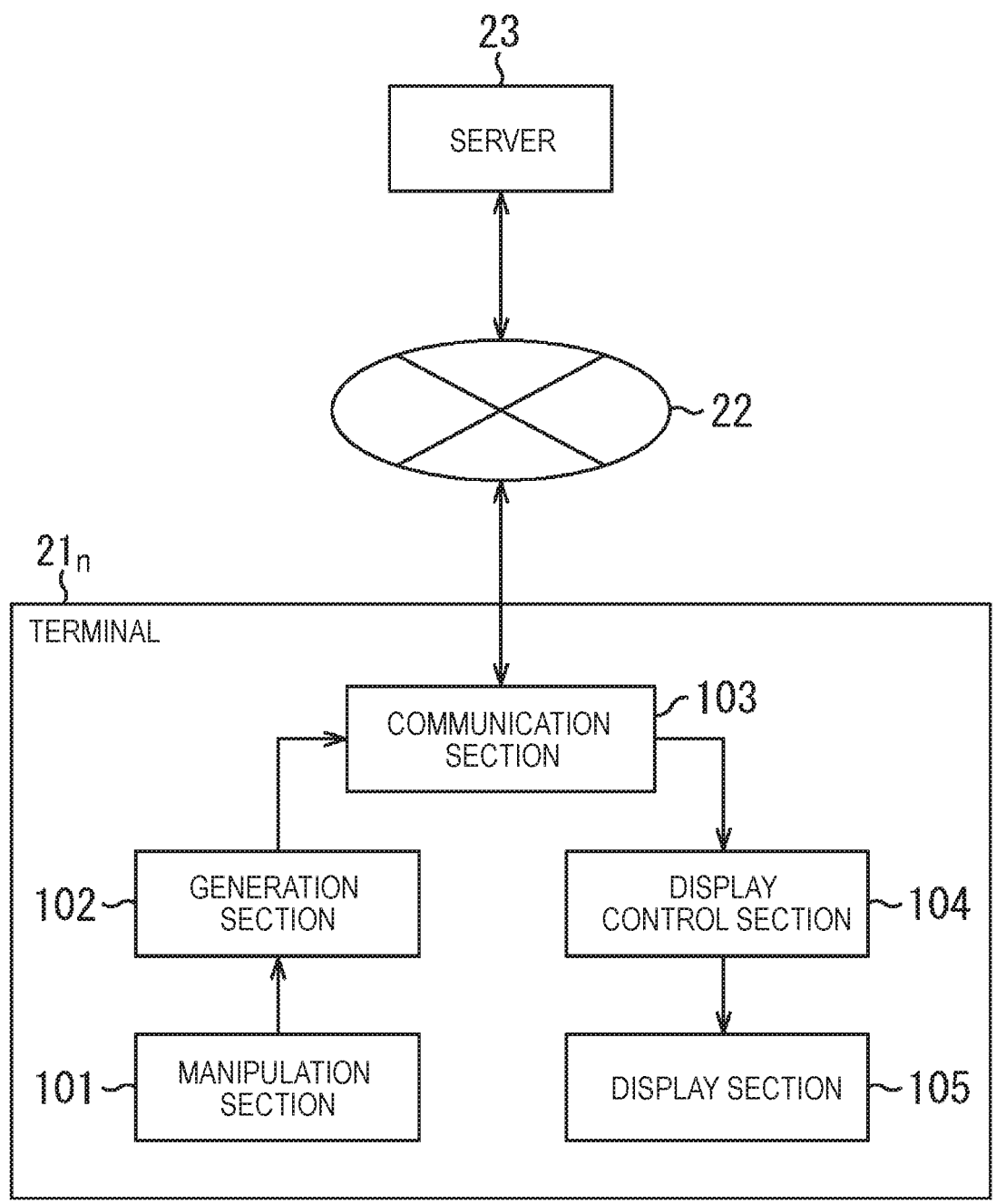
FIG. 11 is a block diagram illustrating a configuration example of a terminal.

Next, FIG. 11 illustrates a configuration example of a terminal $21_n$.

The terminal $21_n$ is a notebook computer or the like and includes a manipulation section 101, a generation section 102, a communication section 103, a display control section 104, and a display section 105. Note that the manipulation section 101 may be formed to be integral with the terminal $21_n$ or to be connected to the terminal $21_n$ through a cable or the like. This holds true for the display section 105.

The manipulation section 101 is a keyboard or the like, and manipulated by the user of the terminal $21_n$. For example, in accordance with the editing manipulation by the user, the manipulation section 101 supplies the generation section 102 with a manipulation signal corresponding to the user's editing manipulation.

Note that when the manipulation section 101 is connected to the terminal $21_n$ through a cable or the like, not only a keyboard but also a mouse or the like may be employed as the manipulation section 101.

The generation section 102 generates update information corresponding to the user's editing manipulation based on the manipulation signal from the manipulation section 101, and supplies the communication section 103 with the update information.

The communication section 103 supplies (transmits) the update information from the generation section 102 to the server 23 through the network 22.

In addition, the communication section 103 receives and thereby acquires display information supplied from the server 23 through the network 22. Then, the communication section 103 supplies the display control section 104 with the acquired display information.

The display control section 104 causes the display section 105 to display the editing window 41 based on the display information from the communication section 103.

The display section 105 is an LCD (Liquid Crystal Display) or the like, and displays the editing window 41 under the control of the display control section 104.

[Explanation of Operation of Terminal $21_n$]

Figure 12:
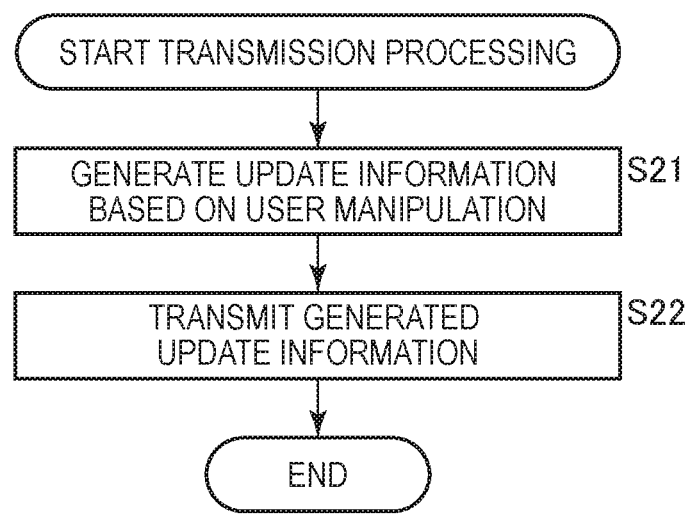
FIG. 12 is a flowchart illustrating transmission processing performed by a terminal.

Next, with reference to a flowchart in FIG. 12, a description is given of transmission processing in which a terminal $21_n$ generates and transmits update information to the server 23.

The transmission processing is started, for example, when the user performs editing manipulation by using the manipulation section 101 of the terminal $21_n$. At this time, the manipulation section 101 supplies the generation section 102 with a manipulation signal corresponding to the user's editing manipulation.

In Step S21, the generation section 102 generates update information corresponding to the user's editing manipulation based on the manipulation signal from the manipulation section 101, and supplies the communication section 103 with the update information.

In Step S22, the communication section 103 supplies the server 23 through the network 22 with the update information received from the generation section 102. Then, the transmission processing is terminated.

As described above, according to the transmission processing, the communication section 103 of the terminal $21_n$ supplies the server 23 through the network 22 with the update information corresponding to the user's editing manipulation.

Accordingly, the server 23 can update an editing target and state information to be up-to-date, based on the update information from the terminal $21_n$. The server 23 can make the editing window 41 of each terminal $21_n$ up-to-date, based on the editing target and the state information which are made up-to-date.

Figure 13:
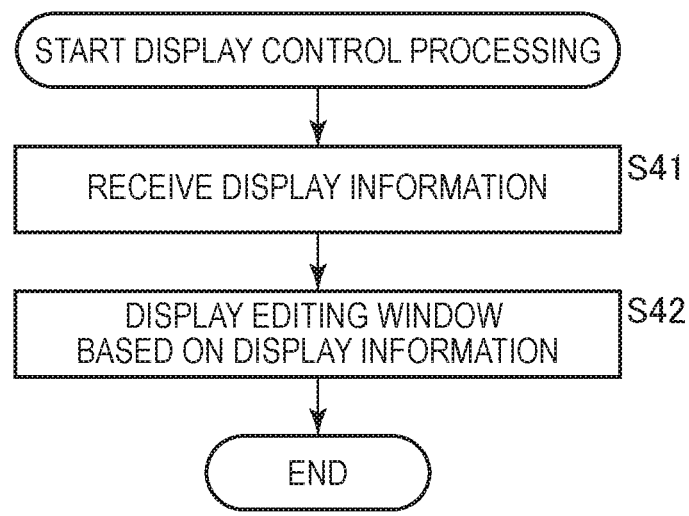
FIG. 13 is a flowchart illustrating display control processing performed by a terminal.

Next, with reference to a flowchart in FIG. 13, a description is given of display control processing in which the terminal $21_n$ controls the displaying of the editing window 41.

The display control processing is started, for example, when the server 23 transmits display information addressed to the terminal $21_n$ to the terminal $21_n$ through the network 22.

In Step S41, the communication section 103 receives and thereby acquires the display information addressed to the terminal $21_n$ supplied from the server 23 through the network 22, and supplies the display control section 104 with the acquired display information.

In Step S42, the display control section 104 causes the display section 105 to display the editing window 41 based on the display information from the communication section 103. Then, the display control processing is terminated.

As described above, according to the display control processing, the display control section 104 displays the editing window 41 based on the display information supplied from the server 23 through the network 22 and the communication section 103.

Accordingly, the display control processing makes it possible to display, in collaborative editing, the editing window 41 on which the states of editing performed by a plurality of different users are reflected.

Thus, a user who edits an editing target while referencing to the editing window 41 can perform editing work while recognizing the state of editing performed by the other users. This makes it possible to enhance the work efficiency of the collaborative editing.

[Configuration Example of Server 23]

Figure 14:
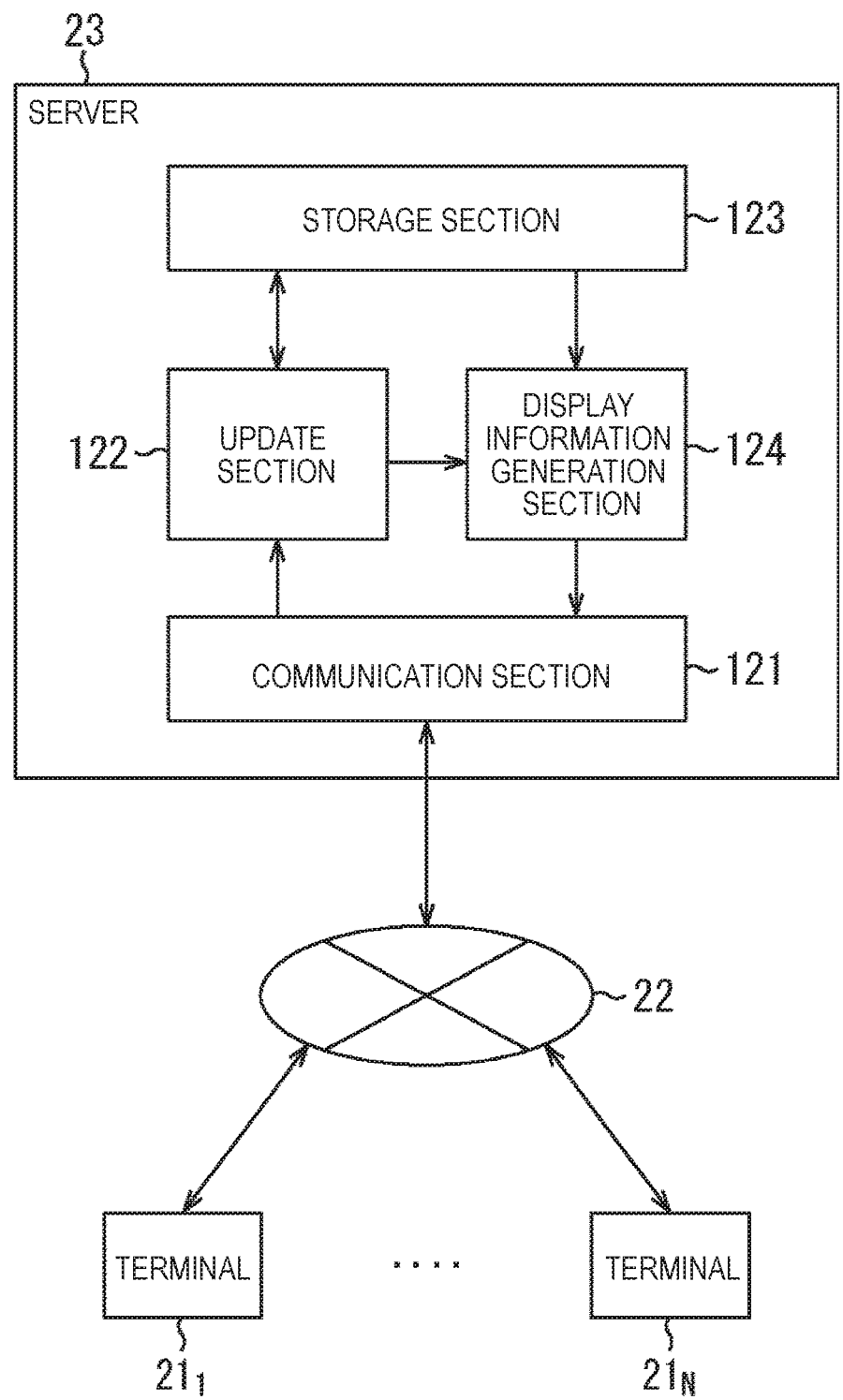
FIG. 14 is a block diagram illustrating a configuration example of a server.

Next, FIG. 14 illustrates a configuration example of the server 23.

The server 23 includes a communication section 121, an update section 122, a storage section 123, and a display information generation section 124.

The communication section 121 supplies the update section 122 with update information supplied from a terminal $21_n$ through the network 22.

The communication section 121 also controls the displaying of the editing window 41 performed by the display section 105 of the terminal $21_n$, based on display information addressed to the terminal $21_n$ which is supplied from the display information generation section 124.

In other words, for example, the communication section 121 supplies the terminal $21_n$ through the network 22 with the display information addressed to the terminal $21_n$ which is supplied from the display information generation section 124, and thereby causes the display section 105 of the terminal $21_n$ to display the editing window 41 based on the display information addressed to the terminal $21_n$.

The update section 122 determines a target terminal based on the update information from the communication section 121 and state information (for example, user information) held in the storage section 123, and supplies the display information generation section 124 with an user ID representing the user of the determined target terminal.

In addition, the update section 122 updates an editing target and the state information stored in the storage section 123, based on the update information from the communication section 121.

The storage section 123 stores (holds) therein, as the editing target and the state information, user information, unread information, and the like.

The display information generation section 124 generates and thereby acquires the display information addressed to the terminal $21_n$ of the user identified by the user ID received from the update section 122, based on the editing target and the state information which are updated by the update section 122, and supplies the communication section 121 with the display information.

[Explanation of Operation of Server 23]

Figure 15:
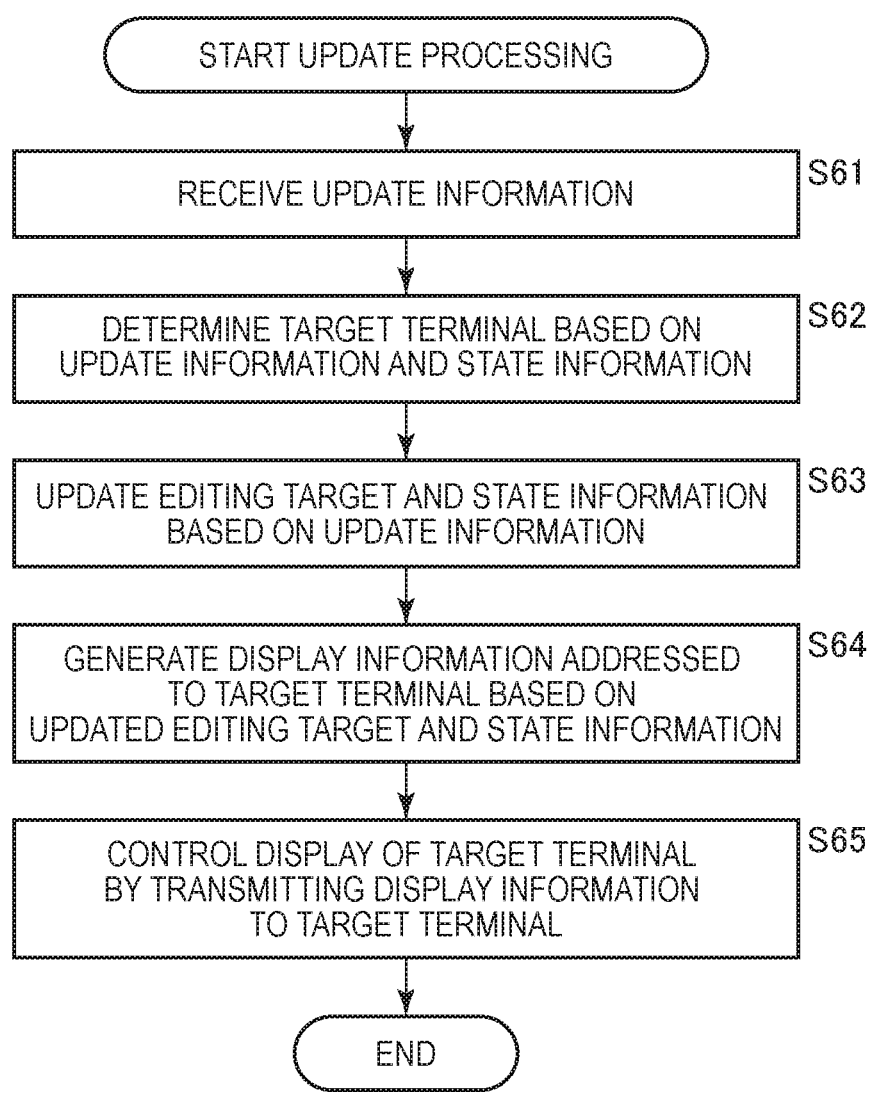
FIG. 15 is a flowchart illustrating update processing performed by a server.

Next, with reference to a flowchart in FIG. 15, a description is given of update processing in which the server 23 updates an editing target and state information based on update information from a terminal $21_n$ and generates and transmits display information addressed to the terminal $21_n$.

The update processing is started, for example, when the terminal 21 transmits update information to the server 23 through the network 22.

In Step S61, the communication section 121 receives the update information from the terminal $21_n$ through the network 22, and supplies the update section 122 with the update information.

In Step S62, the update section 122 determines a target terminal which is a transmission target of the display information, based on the update information from the communication section 121 and the user information as the state information stored in the storage section 123, and supplies the display information generation section 124 with a user ID representing a user of the determined target terminal.

In Step S63, the update section 122 updates the editing target and the state information (for example, the user information or the unread information) stored in the storage section 123, based on the update information from the communication section 121.

In Step S64, the display information generation section 124 generates and thereby acquires display information addressed to the terminal $21_n$ (target terminal) of the user represented by the user ID received from the update section 122, based on the editing target and the state information stored in the storage section 123, and supplies the communication section 121 with the display information.

In Step S65, the communication section 121 transmits, to the terminal $21_n$ through the network 22, the display information addressed to the terminal $21_n$ which is received from the display information generation section 124, and thereby controls the displaying in the terminal $21_n$. After the aforementioned steps, the update processing is terminated.

As described above, according to the update processing, the server 23 updates the editing target and the state information indicating the state of editing by the user (such as a caret position or the editing type), based on the update information supplied from the terminal $21_n$ through the network 22.

Then, the server 23 generates the display information of the terminal $21_n$ which is the target terminal based on the editing target and the state information which are updated, and supplies the terminal $21_n$ with the display information through the network 22. Thereby, the server 23 causes the display section 105 of the terminal $21_n$ to display the up-to-date editing window 41.

Accordingly, in the display section 105 of the terminal $21_n$, the state of editing by the user A of the terminal $21_n$, the state being displayed in the view range can be viewed by using the user's own view 41a, and the state of editing beyond the view range of the user A can be viewed by using the entire view 41b.

Thus, even if, for example, the user B is not editing the editing target in the view range of the user's own view 41a of the user A, use of the entire view 41b enables the user A to easily know the state of editing by the user B. This enables the plurality of users to efficiently edit the editing target held in the server 23.

In the first embodiment, the description has been given of the displaying the caret 81a of the user A and the like in the user's own view 41a of the user A.

However, the user's own view 41a may display, as a manipulation GUI, a dialogue or the like for changing the font of characters, the manipulation GUI being manipulated when an editing target is edited and displaying the content of the editing.

In this case, the manipulation GUI information including the position of the manipulation GUI is also used as the state information held in the server 23. Then, the server 23 updates not only the user information but also the manipulation GUI information in accordance with the update information from the terminal $21_n$ and generates display information for displaying the editing window 41 including the manipulation GUI, based on the user information, the manipulation GUI information, and the like which are updated.

The server 23 supplies a target terminal with the generated the display information through the network 22, and thereby causes the target terminal to display the editing window 41 including the manipulation GUI.

Moreover, also for the manipulation GUI, it is possible to set any one of "collaboration", "exclusion (low)", and "exclusion (high)" in the same manner as for the editing range as described with reference to FIG. 8.

2. Second Embodiment

[Example of Editing Window Displaying Dialogue as Manipulation GUI]

Figure 16:
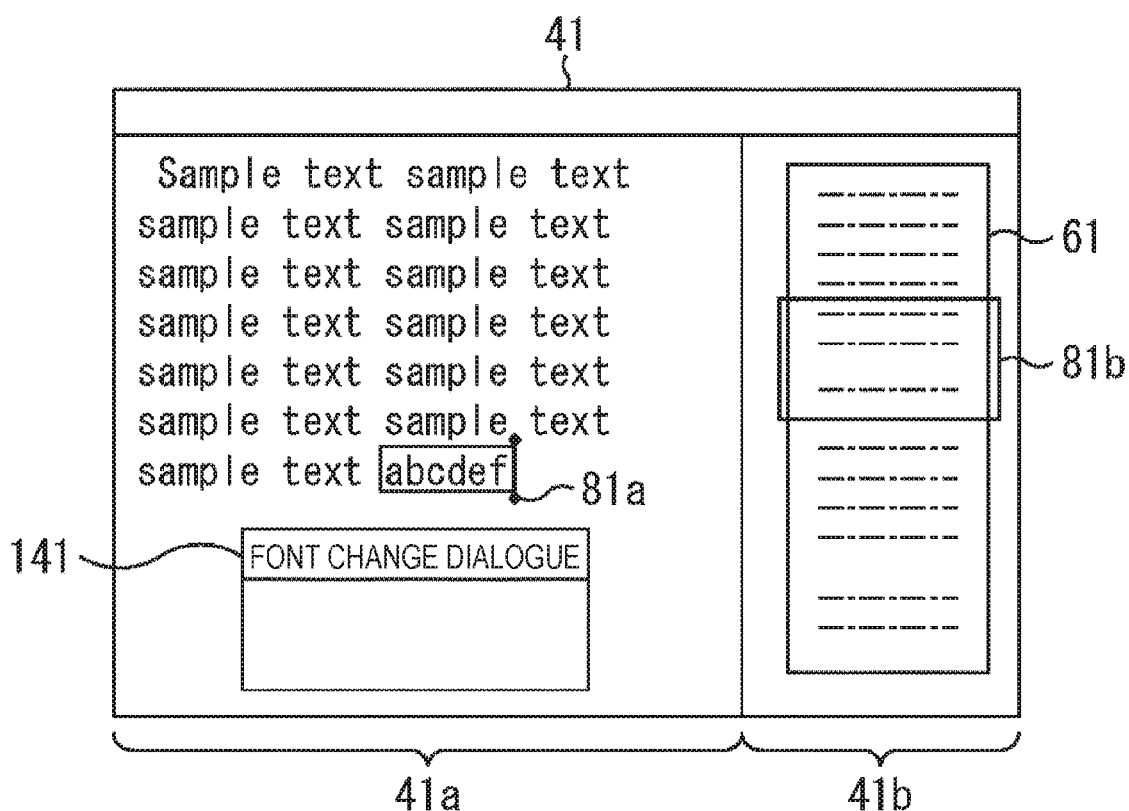
FIG. 16 is a sixth diagram illustrating an example of an editing window displayed in a terminal.

Next, FIG. 16 illustrates another example of the editing window 41 displayed in a terminal $21_n$.

In FIG. 16, the user's own view 41a of the user A of the terminal 21 displays as the manipulation GUI a dialogue 141 for, for example, changing the font.

Note that FIG. 16 illustrates only the caret 81a of the user A and the like to avoid complexity of the figure, and omits carets of the other users such as the user B.

The user A uses the manipulation section 101 of the terminal $21_n$ to perform selection manipulation by which a text string "abcdef" displayed in the user's own view 41a is selected by using the caret 81a.

In addition, the user A uses the manipulation section 101 of the terminal $21_n$ to perform display manipulation for displaying the dialogue 141 for changing the font of the selected text string "abcdef", so that the dialogue 141 is displayed in the user's own view 41a.

In this case, for example, the terminal $21_n$ appropriately generates update information in accordance with the selection manipulation or the display manipulation by the user A, and supplies the server 23 with the update information through the network 22. The server 23 updates state information such as manipulation GUI information which is held in the server 23, based on the update information supplied from the terminal $21_n$ through the network 22, and generates display information addressed to the terminal $21_n$ based on the updated state information.

The server 23 supplies the terminal $21_n$ through the network 22 with the generated display information addressed to the terminal $21_n$ and thereby causes the display section 105 of the terminal $21_n$ to display the editing window 41 as illustrated in FIG. 16.

For example, when "exclusion (high)" is set for the dialogue 141, the dialogue 141 is displayed in the user's own view 41a of only the user A. Accordingly, in this case, only the user A can manipulate the dialogue 141 in the user's own view 41a of the user A.

Note that restriction information (such as "exclusion (high)") set for the dialogue 141 due to the manipulation by the user A is included in the update information and is supplied from the terminal $21_n$ to the server 23 through the network 22.

For example, when "exclusion (low)" is set for the dialogue 141, the dialogue 141 is displayed in the user's own views 41a of the user A and the other users such as the user B.

Note that when "exclusion (low)" is set for the dialogue 141, only the user A can change the font by manipulating the dialogue 141.

Further, for example, when "collaboration" is set for the dialogue 141, the dialogue 141 is displayed in the user's own views 41a of the user A and the other users such as the user B. The other users such as the user B as well as the user A can also change the font by manipulating the dialogues 141 displayed in the respective user's own views 41a.

Next, FIG. 17 illustrates an example of the user's own view 41a displaying a plurality of the manipulation GUIs.

Note that FIG. 17 illustrates only the user's own view 41a to avoid complexity of the figure and omits the entire view 41b.

Incidentally, the editing window 41 may be designed to display only the user's own view 41a as illustrated in FIG. 17.

As illustrated in FIG. 17, the user's own view 41a displays a plurality of dialogues $141a_1$, $141a_2$, and $141a_3$ as the manipulation GUIs.

The dialogue $141a_1$ is a dialogue generated in accordance with manipulation by, for example, the user A of the terminal $21_n$ which displays the user's own view 41a in FIG. 17, and represents a manipulation GUI manipulated in changing the font of a text string $142a_1$ selected by the user A.

The dialogue $141a_1$ displays, for example, a selection menu for selecting the font of the text string $142a_1$ to display the content of the editing.

Note that the dialogue $141a_1$ is displayed at a position corresponding to the text string $142a_1$ which is a font change target. In other words, for example, the position (for example, the center of gravity) of the dialogue $141a_1$ is within a predetermined distance away from the position of the text string $142a_1$. This holds true for the dialogues $141a_2$ and $141a_3$.

The dialogue $141a_2$ is a dialogue generated in accordance with manipulation by, for example, the user B, and represents a manipulation GUI which is manipulated in editing an editing range $142a_2$ selected by the user B and which displays the content of editing in the editing range $142a_2$. In addition, a thumbnail $143a_2$ of the user B and the user name "Rodrigues" are displayed near the dialogue $141a_2$.

Further, for example, the content of description in the editing range $142a_2$ is displayed as a reflection flipped left-to-right in the dialogue $141a_2$. Note that the dialogue $141a_2$ may be displayed in a deformed manner. In other words, the dialogue $141a_2$ may be displayed, for example, as a balloon of the user B. This holds true for the dialogue $141a_3$.

The dialogue $141a_3$ is a dialogue generated in accordance with manipulation by, for example, the user C, and represents a manipulation GUI which is manipulated in editing a still image $142a_3$ selected by the user C and which displays the content of editing of the still image $142a_3$. In addition, the thumbnail $143a_3$ of the user C and the user name "Jennifer" are displayed near the dialogue $141a_3$.

Further, for example, the still image $142a_3$ is displayed as a reflection flipped left-to-right in the dialogue $141a_3$.

The user A views the dialogues $141a_2$ and $141a_3$ displayed in the user's own view 41a of the user A as illustrated in FIG. 17, and thereby can easily know the state of editing by the users B and C.

Further, in FIG. 17, the user's own view 41a of the user A displays, in the discriminatory manner, the dialogue $141a_1$ generated by the user A and the dialogues $141a_2$ and $141a_3$ generated by the users B and C.

Specifically, for example, the dialogue $141a_1$ is displayed as a plane parallel to the plane of the user's own view 41a, as illustrated in FIG. 17. In addition, for example, the dialogues $141a_2$ and $141a_3$ are three-dimensionally displayed in such a manner as to be obliquely tilted with respect to the plane of the user's own view 41a.

In addition, the dialogues $141a_2$ and $141a_3$ are transparent. The user A can thus view the editing target displayed in the user's own view 41a, through the dialogues $141a_2$ and $141a_3$.

Further, the user's own view 41a displays the front side of the dialogue $141a_1$ and the back sides of the dialogues $141a_2$ and $141a_3$. In other words, for example, the dialogue $141a_1$ displays characters, graphics, and the like as they are, while the dialogues $141a_2$ and $141a_3$ display characters (mirror writing), graphics, and the like flipped left-to-right.

Accordingly, it is possible to display as if the user B (Rodrigues in this case) displayed in the thumbnail $143a_2$ were changing the description content of the editing range $142a_2$ by manipulating the dialogue $141a_2$ in the user's own view 41a, as illustrated in FIG. 17.

This holds true for the dialogue $141a_3$. That is, it is possible to display as if the user C (Jennifer in this case) displayed in the thumbnail $143a_3$ were cropping (trimming) the still image $142a_3$ by manipulating the dialogue $141a_3$.

In addition, since the front side of the dialogue $141a_1$ is displayed in the user's own view 41a as illustrated in FIG. 17, the user A editing the editing target while referencing to the user's own view 41a can edit the font of the text string 142a, by manipulating the dialogue $141a_1$.

Incidentally, the dialogues $141a_1$ to $141a_3$ in the user's own view 41a are preferably displayed without overlapping with each other.

Accordingly, for example, to prevent the overlapping, the server 23 may generate display information for displaying the dialogues $141a_1$ to $141a3$ in which arrangement thereof, sizes, and the like are changed.

In this case, the terminal $21_n$ can display the dialogues $141a_1$ to $141a_3$ not overlapping with each other in the user's own view 41a, based on the display information supplied from the server 23 through the network 22.

In addition, for example, when the dialogues $141a_1$ to $141a_3$ overlap with each other, the order of layers may be determined according to the priority. Note that the priority may be set in advance, or may be set by, for example, the user A of the terminal $21_n$.

In other words, for example, when the dialogues $141a_1$ to $141a_3$ overlap with each other, the dialogue $141a_1$ may be displayed on the uppermost layer according to the priority; the dialogue $141a_2$, behind the dialogue $141a_1$; and the dialogue $141a_3$, behind the dialogue $141a_2$.

Meanwhile, for example, the user A designates an editing range and edits the editing target in the editing range.

Accordingly, the user A can cancel the editing manipulation in the designated editing range to restore the state thereof to the state before the editing manipulation, by performing, for example, Undo representing manipulation of cancelling the most recent editing manipulation.

However, for example, when the user A is performing collaborative editing or the like and thus is editing the editing target in the same editing range as for the user B, performing Undo by the user A might unintentionally cancel the editing manipulation by the user B.

To put it differently, suppose a case where the user B performs the editing manipulation after the user A performs the editing manipulation. When the user A then performs Undo, the editing manipulation immediately before Undo, that is, the editing manipulation by the user B is cancelled.

Hence, a conceivable way to prevent such an incident is editing the editing target in a unit of an object (component of the editing target). In other words, it is conceivable that the editing target including a plurality of objects is collaboratively edited in the unit of the object.

Specifically, for example, each user separately writes text, and text written by each user is regarded as an object. The collaborative editing is performed in the unit of the object.

In this case, update information is information for updating text as an object edited by a user, information for instructing for combining or separating objects, and the like.

In addition, at least, for example, history information indicating a history of editing an object is employed as state information held in the server 23.

3. Third Embodiment

[Example of User's Own View 41a Displaying Plurality of Objects]

Next, FIG. 18 illustrates an example of the user's own view 41a displaying a plurality of objects.

The user's own view 41a of, for example, the user A displays a plurality of objects 161, 162, 163, 164, and 165 included in an editing target, as illustrated in FIG. 18.

In FIG. 18, the object 161 being currently edited by the user A and the objects 164 and 165 having edited by the user A and another user such as the user B are displayed as they are.

Note that the user's own view 41a of the user A may display the object 161 being currently edited by the user A in such a manner as to discriminate from the objects 164 and 165.

In addition, the objects 162 and 163 being currently edited by the other users such as the user B are displayed in such a manner as to be, for example, semitransparent and flipped light-to-left. Note that the degree of transparency of the objects 162 and 163 is not limited to the semitransparency.

Further, in FIG. 18, thumbnails 181, 182, 183, 184, and 185 in the user's own view 41a of the user A represent the users who have edit the objects 161, 162, 163, 164, and 165 most recently, respectively.

Note that the objects 161 to 165 can be displayed in such a manner as not to overlap with each other, like the manipulation GUIs described in the second embodiment.

In addition, for example, when the objects 161 to 165 overlap with each other, the objects 161 to 165 are displayed in the order, for example, according to the priority of the objects, like the manipulation GUIs described in the second embodiment.

Further, for example, "exclusion (high)", "exclusion (low)", and "collaboration" can be set for the objects 161 to 165 as for the manipulation GUIs.

In addition, for example, the user A can move the objects 161 to 165 and change the sizes of the objects 161 to 165, by manipulating the terminal $21_n$ while referencing to the user's own view 41a of the user A. This holds true for the other users such as the user B.

In this case, update information in accordance with the manipulation by the user A is generated by the terminal $21_n$ of the user A, and is supplied to the server 23 through the network 22.

The server 23 generates display information for displaying the editing window 41 including the user's own view 41a as illustrated in FIG. 18, based on the update information and the like supplied from the terminal $21_n$ through the network 22.

Then, the server 23 supplies terminals $21_n$ which are target terminals through the network 22 with the generated display information, and thereby causes the terminals $21_n$ to display the editing window 41 including the user's own view 41a as illustrated in FIG. 18.

[Example of History Information]

Figure 19:
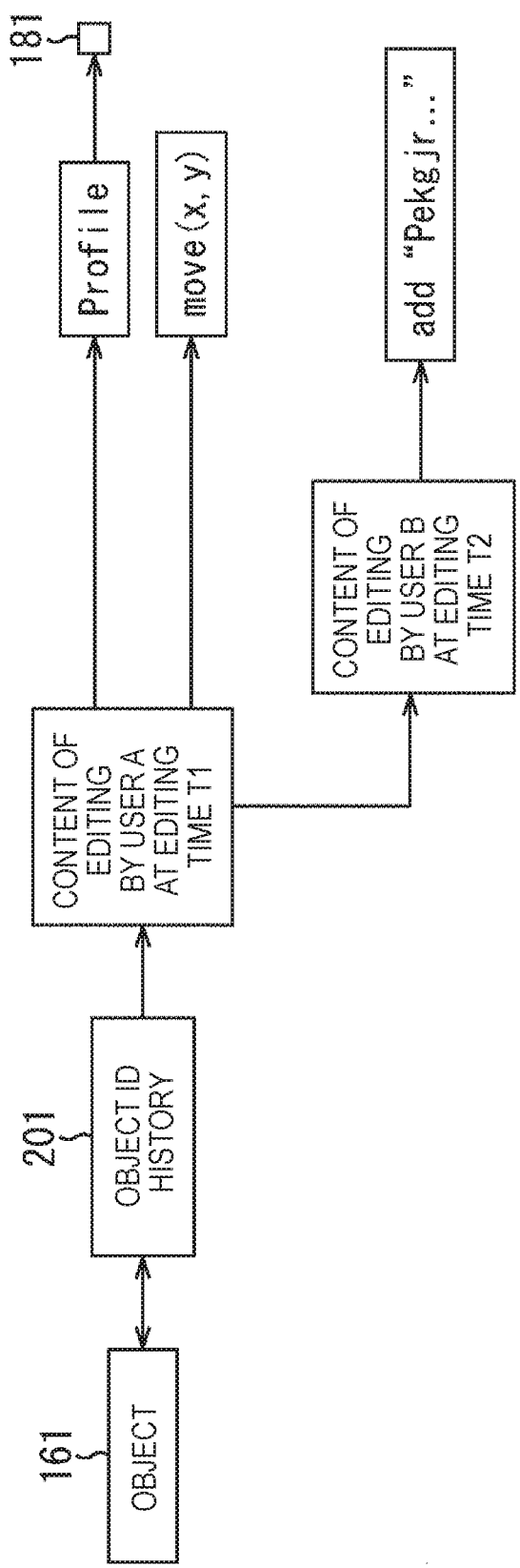
FIG. 19 is a first diagram illustrating an example of history information of an object.

Next, FIG. 19 illustrates an example of history information 201 of the object 161 held as state information in the server 23.

The history information 201 indicates a history of editing the object 161 and is associated with an object ID for uniquely identifying the object 161.

The history information 201 indicates that the user A edits the object 161 at editing time T1, with the editing content being move (x, y).

The editing content of move (x, y) indicates that the object 161 is moved to a position (x, y) in the document, that is, the position (x, y) of the object 161 in the user's own view 41a illustrated in FIG. 18.

The history information 201 also indicates that the user B edits the object 161 at editing time T2 which is prior to editing time T1, with the editing content being add "Pekgjr". The editing content of add "Pekgjr" indicates that a character string "Pekgjr . . . " is added to the object 161.

Further, the history information 201 includes profile information Profile on the user A who is the last editor of the object 161. The profile information Profile is used to display the thumbnail 181 near the upper left corner of the object 161.

As for the objects 162 to 165, history information configured in the same manner as for the object 161 is also held in the server 23. The history information is updated by the server 23 based on update information supplied from the terminal 21$_n$ through the network 22.

Figure 20:
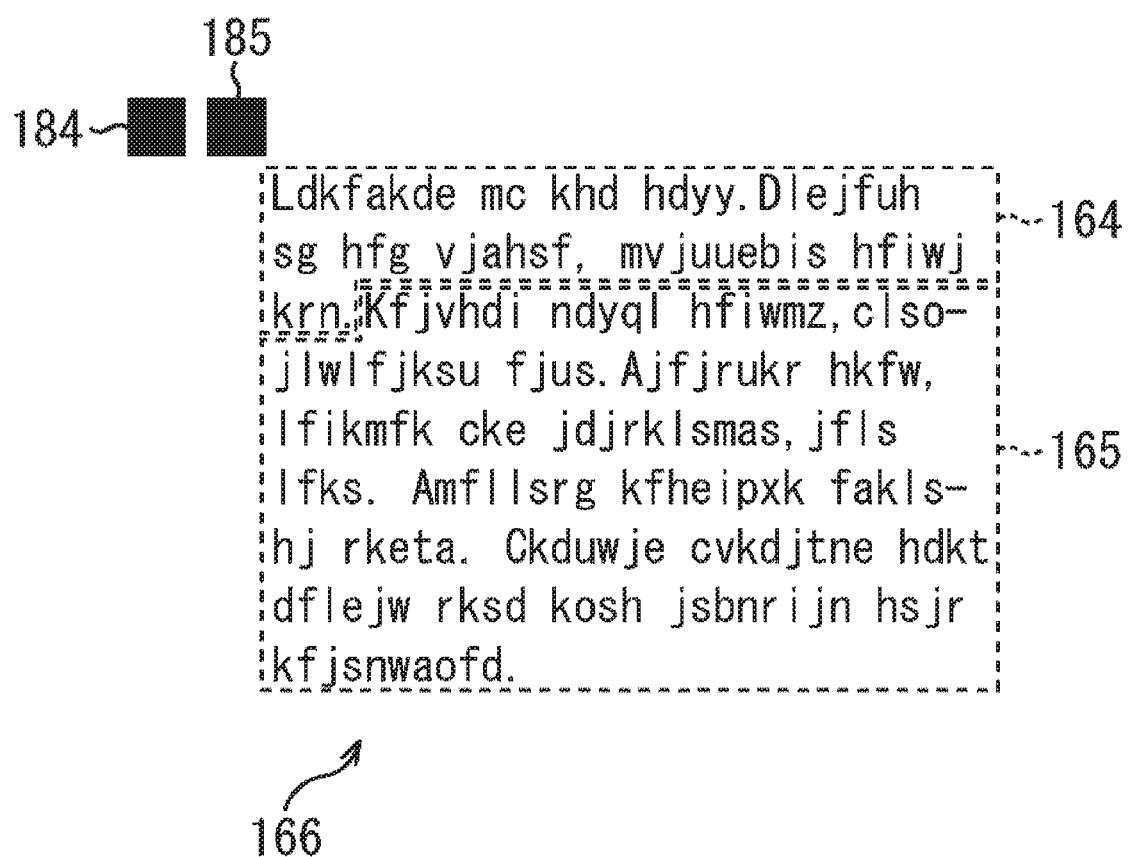
FIG. 20 is a diagram illustrating an example of a new object obtained by merging objects.

Next, FIG. 20 illustrates an example of an object 166 newly obtained by merging the object 164 and the object 165.

For example, when the user A performs the merge manipulation for adding the object 165 to the end of the object 164 which is text by using the terminal 21$_n$, the terminal 21$_n$ generates update information in accordance with the merge manipulation by the user A, and supplies the server 23 with the update information through the network 22.

The server 23 updates an object and history information thereof as state information held therein, based on the update information supplied from the terminal 21$_n$ through the network 22.

Then, the server 23 generates display information addressed to the terminal 21$_n$ based on the updated object and history information, and supplies the terminal 21$_n$ with the display information through the network 22. Thereby, the server 23 causes the terminal 21$_n$ to display the user's own view 41$a$ including the object 166 as illustrated in FIG. 20.

The thumbnail 184 for the object 164 and the thumbnail 185 for the object 165 are displayed near the upper left corner of the object 166.

The plurality of users can easily understand that the object 166 is newly generated by merging the object 164 and the object 165, for example, from the thumbnails 184 and 185 displayed near the upper left corner of the object 166.

With reference to FIG. 20, when the thumbnail 184 displayed near the upper left corner of the object 166 is selected, the object 164 corresponding to the thumbnail 184 is displayed. As a method for displaying the object 164 in this case, pop-up display can be employed, for example. This holds true for the thumbnail 185.

Note that the thumbnail 184 is selected by performing mouseover of hovering the mouse cursor over the thumbnail 184, clicking the thumbnail 184, or the like.

Further, in FIG. 20, as cancellation manipulation, for example, by which the user A and the other users such as the user B cancel the merge manipulation by the user A, it is possible to perform select and drag the thumbnail 184 or 185 displayed near the upper left corner of the object 166. In this case, the object 166 is separated into the objects 164 and 165 before being merged. That is, the user's own view 41$a$ displays the separated objects 164 and 165, instead of the object 166.

Note that when some or all of collaborative editors permit the merge of the objects 164 and 165, the two thumbnails 184 and 185 displayed near the upper left corner of the object 166 change into the thumbnail of the user A who is the last editor performing the merge manipulation.

Here, when performing explicit manipulation, the collaborative editors can thereby permit the merge of the objects 164 and 165. Besides, for example, when performing no manipulation of the object 166 in a predetermined time period from the start of the display of the object 166, the collaborative editors can thereby permit the merge of the objects 164 and 165 implicitly.

[Another Example of History Information]

Figure 21:
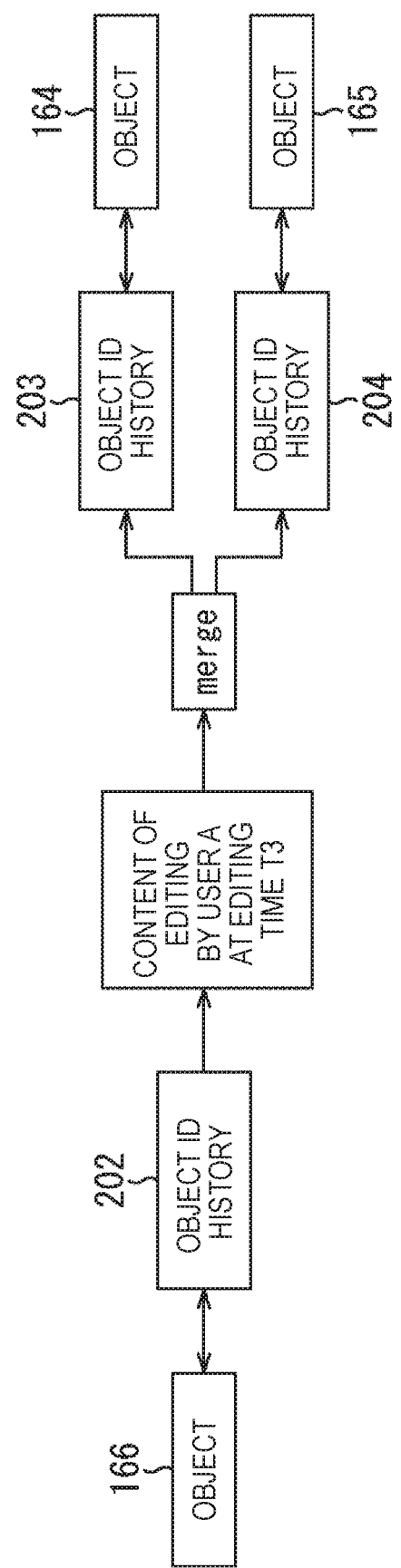
FIG. 21 is a second diagram illustrating an example of history information of an object.

Next, FIG. 21 illustrates an example of history information 202 of the object 166 held as state information in the server 23.

The history information 202 indicates a history of editing the object 166 and is associated with an object ID for uniquely identifying the object 166.

The history information 202 indicates that the user A generates the object 166 by editing the object 164 and the object 165 at editing time T3, with the editing content being merge.

The editing content of merge indicates that the objects 164 and 165 are merged, for example, in such a manner that the object 165 is added to the end of text which is the object 164.

The server 23 generates the history information 202 of the object 166 from history information 203 of the object 164 and history information 204 of the object 165, based on update information supplied from the terminal 21$_n$ in accordance with the merge manipulation by the user A, and holds therein the history information 202 as state information.

Meanwhile, in FIG. 20, the thumbnail 184 for the object 164 and the thumbnail 185 for the object 165 are displayed near the upper left corner of the object 166 to show that the object 166 is an object obtained by merging the objects 164 and 165.

However, for example, for users such as the user B other than the user A having performed the merge manipulation, the structure of the object 166 is difficult to understand from just seeing the object 166 as illustrated in FIG. 20 which is displayed in the user's own views 41$a$.

In other words, it is not possible for the users such as the user B having not performed the merge manipulation to easily understand how the objects 164 and 165 are merged to obtain the object 166.

Hence, it is desirable that the objects 164 and 165 forming the object 166 in FIG. 20 be displayed in the discriminatory manner.

In other words, for example, in the object 166, the object 164 and the object 165 are displayed in such a manner as to be discriminated from each other by using different colors. Thereby, the structure of the object 166 can be easily understood.

Figure 22:
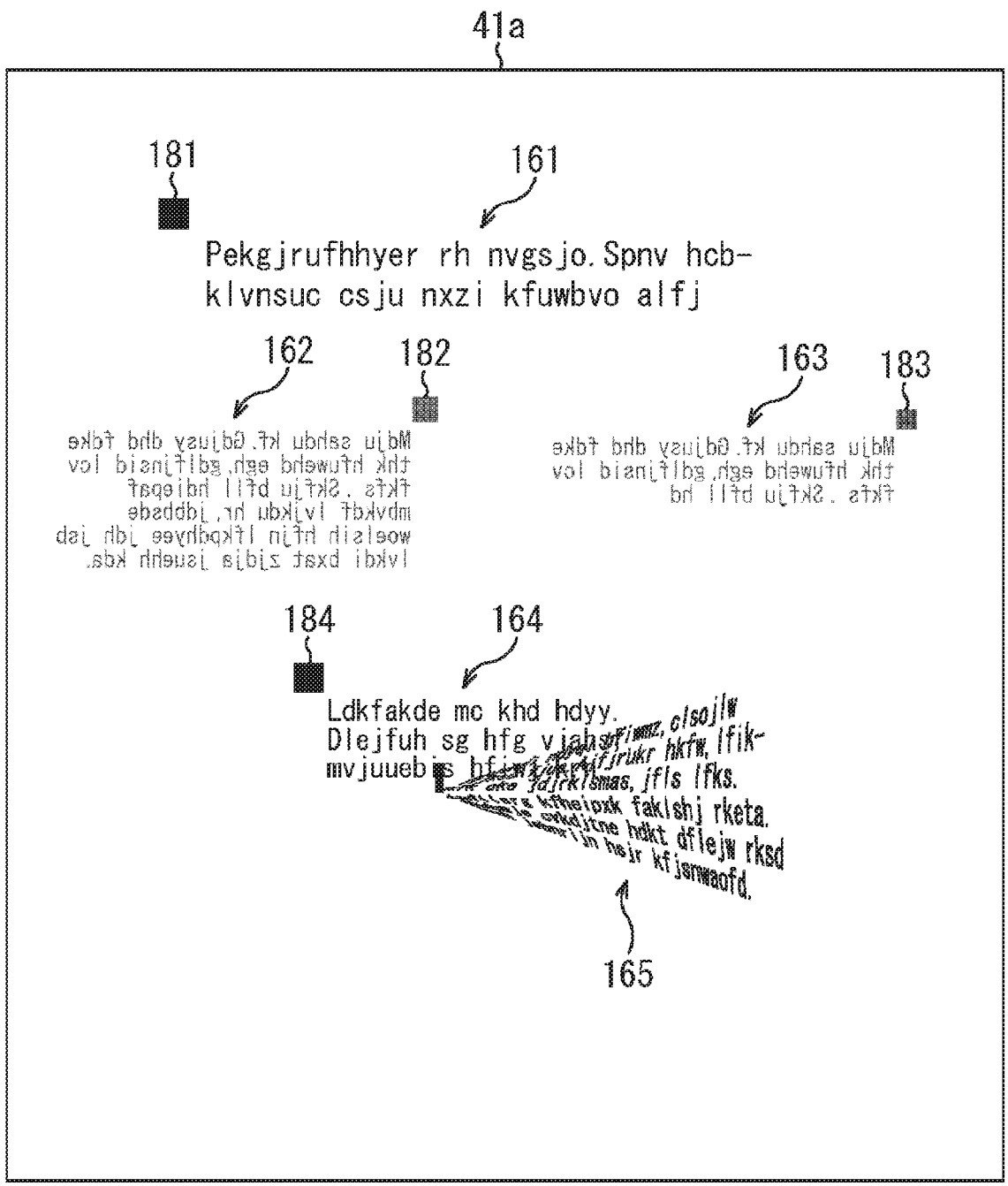
FIG. 22 is a third diagram illustrating an example of a user's own view displayed in a terminal.

Alternatively, the object 166 generated from the objects 164 and 165 may be displayed, for example, as illustrated in FIG. 22 in such a manner as to discriminate between the object 164 and the object 165.

FIG. 22 illustrates an example of the user's own view 41$a$ which displays the object 166 in such a manner as to discriminate between the objects 164 and 165.

The user's own view 41$a$ displays, for example, animation as illustrated in FIG. 22, in accordance with the merge manipulation by the user A for merging the object 164 with the object 165.

In other words, as illustrated in FIG. 22, for example, the user's own view 41$a$ displays the object 164 as it is, and also displays, by using the animation, how the object 165 is being merged with the object 164 to which the object 165 is to be added.

Specifically, for example, the user's own view 41$a$ displays animation showing as if the object 165 were sucked between characters of the object 164, at a position at which the object 165 is added to the object 164. Note that duration of the animation may be a predetermined period or a period set by a predetermined user.

This enables not only the user A having performed the merge manipulation but also the other users such as the user B not having performed the merge manipulation to easily know the position of the object 164 at which the object 165 is added, and the objects 164 and 165 forming the object 166.

Then, for example, when the user B or the like knowing the content of the merged object 166 thinks that the objects 164 and 165 should not have been merged to generate the new object 166, the user B or the like can designate the object 166 to cancel the merge.

Meanwhile, for example, in the case where a work completed through the collaborative editing is reviewed, histories of the editing of the objects are desirably designed to be displayed to enable checking of editing histories of the users and the degree of contribution to the editing.

In other words, in response to a request from the terminal $21_n$, the server 23 can generate display information for displaying a history of editing a certain object, based on the history information and the like held therein.

Figure 23:
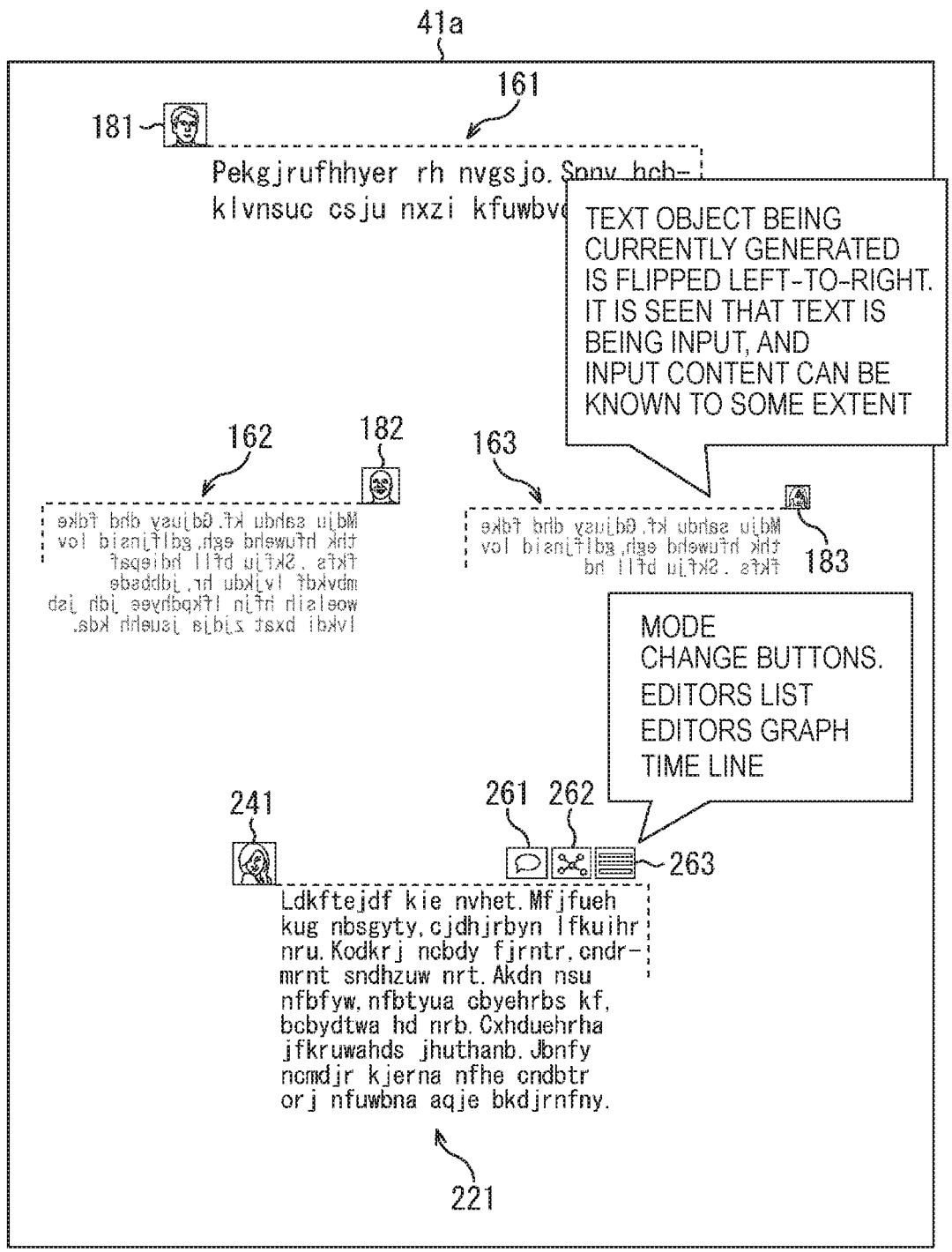
FIG. 23 is a fourth diagram illustrating an example of a user's own view displayed in a terminal.
Figure 24:
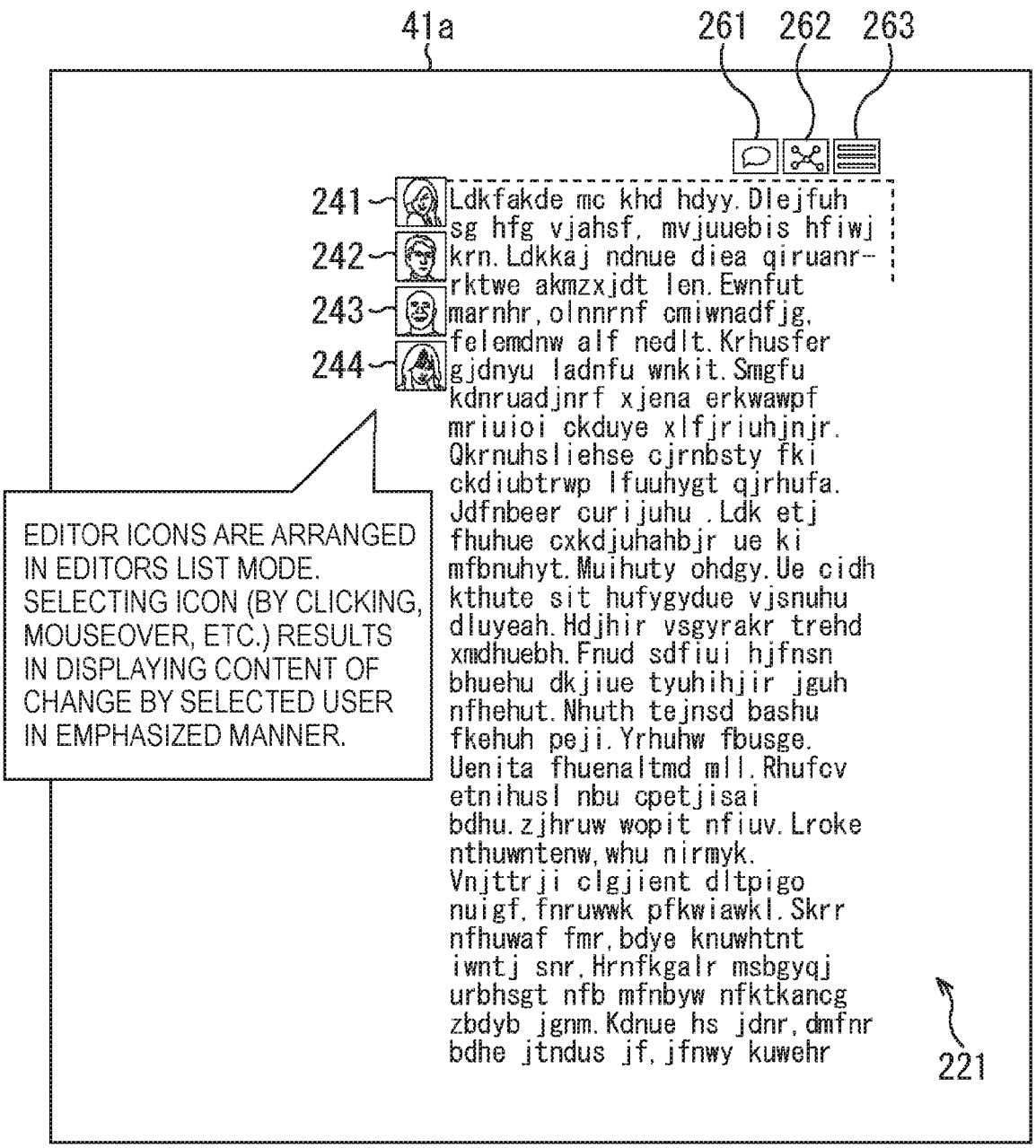
FIG. 24 is a fifth diagram illustrating an example of a user's own view displayed in a terminal.
Figure 25:
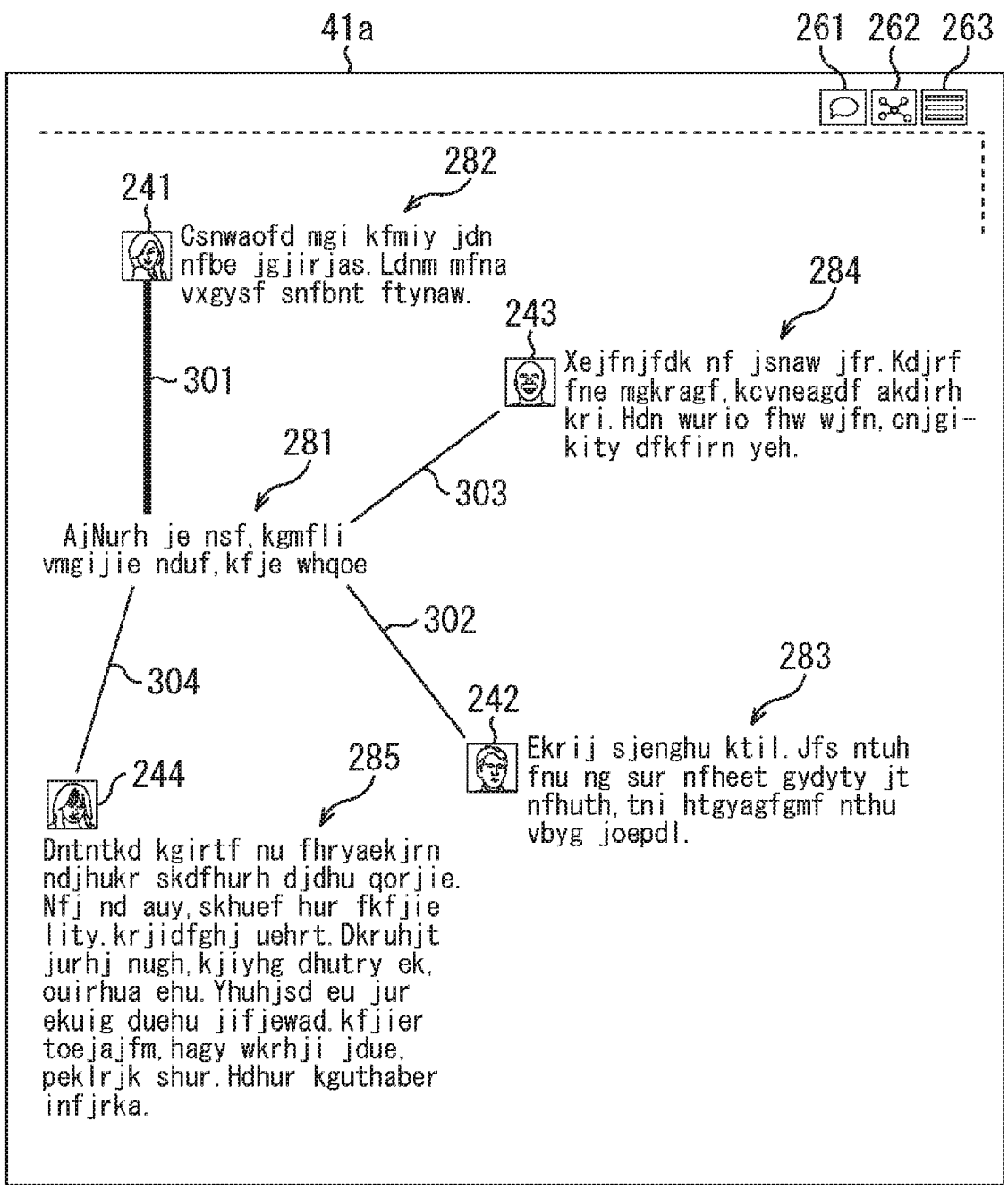
FIG. 25 is a sixth diagram illustrating an example of a user's own view displayed in a terminal.

The server 23 supplies the terminal $21_n$ as a target terminal with the generated display information through the network 22 and thereby can cause the terminal $21_n$ to display the user's own view 41a as illustrated in FIGS. 23 to 25.

Next, FIG. 23 illustrates an example of the user's own view 41a in which buttons for displaying a history of editing an object are arranged.

Note that components which are displayed in the user's own view 41a illustrated in FIG. 23 and are configured in the same manner as in FIG. 18 are denoted by the same reference numerals as in FIG. 18.

In other words, FIG. 23 is different from FIG. 18 in that the thumbnails 181 to 183 display photos of the faces of the last editors, respectively, and that an object 221 and the like are displayed instead of the objects 164 and 165 and the thumbnails 184 and 185 in FIG. 18.

In FIG. 23, the user's own view 41a displays a thumbnail 241 of a user who is the last editor of the object 221 near the upper left corner of the object 221. The user's own view 41a also displays a list button 261, a degree-of-contribution button 262, and a time line button 263 near the upper right corner of the object 221.

Note that the list button 261, the degree-of-contribution button 262, and the time line button 263 are displayed, for example, when a history of editing the object 221 is displayed. By using these buttons, mode of displaying an editing history (display mode) can be changed.

The list button 261 represents a button to be pressed to display a list of users who have edited the object 221.

The degree-of-contribution button 262 represents a button to be pressed to display the degree of contribution representing how much each user having edited the object 221 contributes to the editing.

The time line button 263 represents a button to be pressed to display the history of the editing of the object 221 in time series.

FIG. 24 illustrates an example of the user's own view 41a displayed when, for example, the user A presses the list button 261 through manipulation of the terminal $21_n$.

In FIG. 24, the user's own view 41a displays, in addition to the object 221, the thumbnail 241 and thumbnails 242, 243, and 244 at the left side of the object 221 in a predetermined order from the top down in the figure. In other words, for example, the user's own view 41a displays the thumbnails 241, 242, 243, and 244 respectively representing the most recent editor (the last editor) having edited the object 221, the second recent editor, the third recent editor, and the fourth recent editor, in this order from the top down in the figure.

For example, when the user A selects the thumbnail 242 in the user's own view 41a illustrated in FIG. 24 by mouseover or clicking using the terminal $21_n$ a part edited by the user represented by the thumbnail 242 is displayed in an emphasized manner in the object 221.

This enables the user A referencing to the user's own view 41a illustrated in FIG. 24 to easily know who edits (changes) the object 221 and which part thereof is edited (changed).

Next, FIG. 25 illustrates an example of the user's own view 41a displayed when, for example, the user A presses the degree-of-contribution button 262 through the manipulation of the terminal $21_n$.

In FIG. 25, for example, a text 281 firstly added to the object 221 is displayed in the center of the user's own view 41a, and texts 282, 284, 283, and 285 are displayed in such a manner as to surround the text 281 in this order clockwise from an upper part of the figure.

Thumbnails 241, 243, 242, and 244 are provided near the upper left corners of the texts 282, 284, 283, and 285, respectively.

In addition, the texts 282, 284, 283, and 285 represent parts (for example, the last edited parts) of texts edited by users respectively displayed using the thumbnails 241, 243, 242, and 244.

Further, the text 281 is connected to the texts 282, 284, 283, and 285 through respective lines 301, 303, 302, and 304.

Here, the line 301 has a thickness corresponding to the degree of contribution of the user displayed in the thumbnail 241 to the collaborative editing.

Note that the degree of contribution is determined based on at least one of the number of editing times of the user displayed in the thumbnail 241, an editing time period of the user, the number of times of evaluation of the user made by the other users, and the like.

In FIG. 25, since the user displayed in the thumbnail 241 has the highest degree of contribution in the users displayed in the thumbnails 241 to 244, the line 301 is the thickest in the lines 301 to 304.

Meanwhile, when, for example, the user A presses the time line button 263 through the manipulation of the terminal $21_n$ the user's own view 41a of the user A displays the history of the collaborative editing of the object 221 in time series, for example, downwards from the upper part of the user's own view 41a.

In this case, the user's own view 41a is provided with a slider extending in a vertical direction, and the content of the collaborative editing at any time point can be checked by moving the slider.

As described with reference to FIGS. 23 to 25, the user's own view 41a is designed to display the editing history, for example. Accordingly, it is possible to review the editing target while referencing to the editing history displayed in the user's own view 41a, and thus to enhance the work efficiency of the collaborative editing.

Meanwhile, for example, in the case where the collaborative editors edit objects of texts and thereafter determine the order of arranging the edited objects, it is preferable for each collaborative editor to visually know the arrangement order of the objects in the user's own view 41a.

Figure 26:
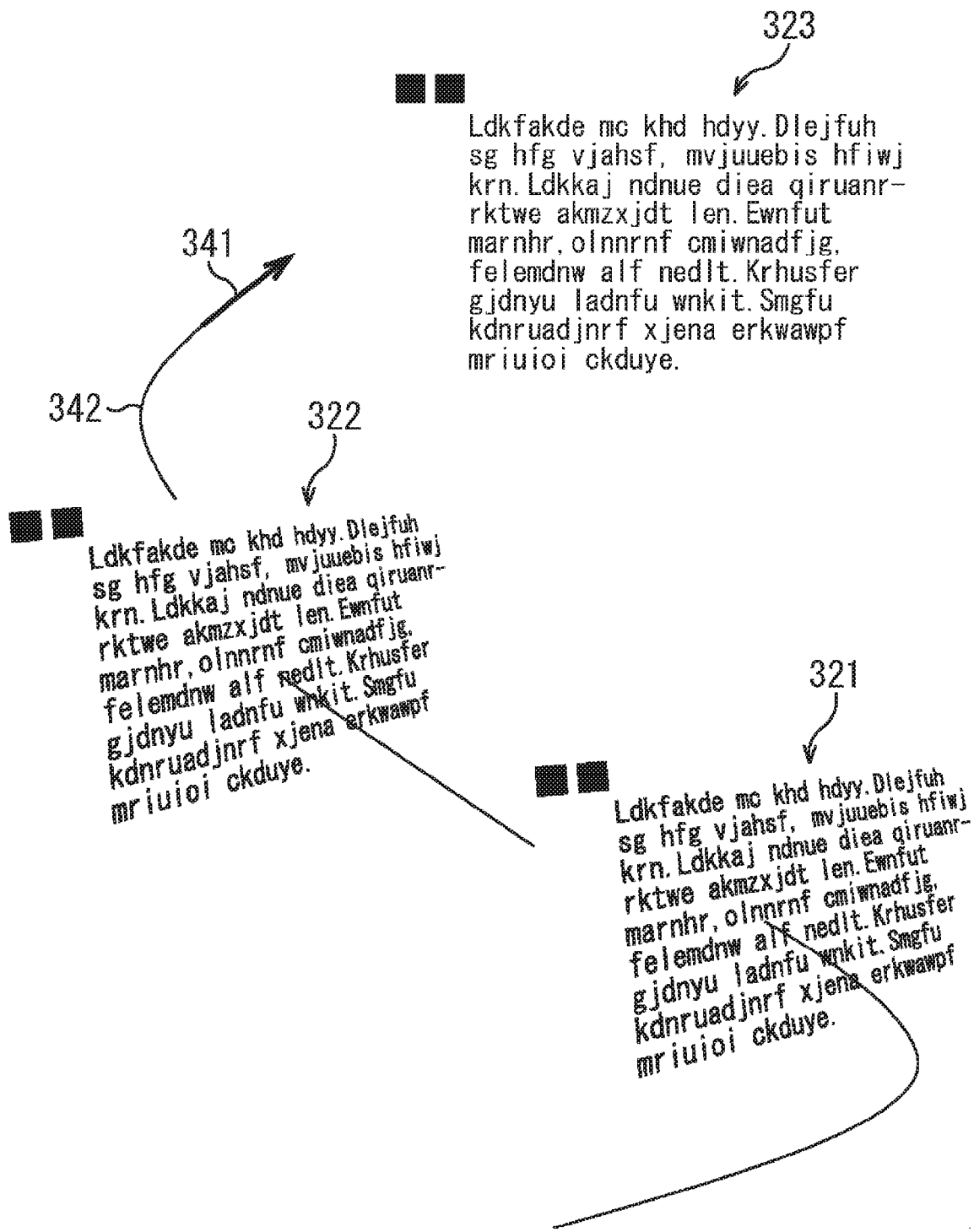
FIG. 26 is a seventh diagram illustrating an example of a user's own view displayed in a terminal.

Next, FIG. 26 illustrates an example of the user's own view 41a displayed when a plurality of users determine the order of arranging objects.

Note that FIG. 26 illustrates the user's own view 41a of, for example, the user A, and the user's own view 41a displays objects 321, 323, and 323 which are texts. FIG. 26 also illustrates a front-end display 341 shaped like a needle and a thread-shaped line 342 representing a line shaped like a thread.

For example, the plurality of users write text formed by the text objects 321 to 323 as illustrated in FIG. 26 by changing the arrangement of the objects 321 to 323, the users work to determine the order of arranging the objects 321 to 323.

In other words, when, for example, the user A on behalf of the other users performs selection manipulation of the objects 321 to 323 in his/her desired order, the selecting order is desirably checked in the user's own view 41a of each user.

Thus, when, for example, the user A performs selection manipulation of the objects 321 and 322 in this order, the objects 321 and 322 as illustrated in FIG. 26 are displayed in the user's own view 41a of the user A, for example.

In other words, the user's own view 41a of, for example, the user A displays that the front-end display 341 provided with the front end of the thread-shaped line 342 passes through the object 321 and then the object 322.

The user's own view 41a of the user A displays, in a discriminatory manner, the objects 321 and 322 having been selected by the user A and the object 323 not having been selected.

Specifically, in the user's own view 41a of, for example, the user A, the objects 321 and 322 having been selected by the user A are displayed three-dimensionally, while the object 323 not having been selected is displayed two-dimensionally. Further, the objects 321 and 322 having been selected by the user A may be displayed in a wavy manner.

These hold true for the user's own view 41a of any of the users other than the user A.

As described with reference to FIG. 26, for example, the user's own view 41a intuitively displays the arrangement order of the objects 321 to 323 (using the front-end display 341 and the thread-shaped line 342). Accordingly, it is possible to review the editing target displayed in the user's own view 41a while referencing to the display as illustrated in FIG. 26 and thus to enhance the work efficiency of the collaborative editing.

Additionally, the present technology may also be configured as below.

(1) A display control apparatus including:

an acquisition section configured to acquire display information for displaying a state of collaborative editing in which a plurality of editors collaboratively edit a same editing target; and a display control section configured to cause an editing screen to display, based on the display information, the state of the collaborative editing performed on a not displayed part not included in a display range displayed when the editing target is displayed on the editing screen referenced to by a first editor among the plurality of editors.

(2) The display control apparatus according to (1), wherein the display control section causes the editing screen to display, based on the display information, a change amount representing an amount of change of the not displayed part owing to the collaborative editing.

(3) The display control apparatus according to (1) or (2), wherein the display control section causes the editing screen to display, based on the display information, a type of the collaborative editing performed on the not displayed part.

(4) The display control apparatus according to any one of (1) to (3), wherein the display control section causes the editing screen to display, based on the display information, an unread display representing a part of the editing target that is not included in the display range.

(5) The display control apparatus according to any one of (1) to (4), wherein the display control section also causes, based on the display information, the state of the collaborative editing performed on the editing target within the display range to be displayed.

(6) A display control method of a display control apparatus that displays an image, the display control method including:

acquiring, by the display control apparatus, display information for displaying a state of collaborative editing in which a plurality of editors collaboratively edit a same editing target; and causing, by the display control apparatus, an editing screen to display, based on the display information, the state of the collaborative editing performed on a not displayed part not included in a display range displayed when the editing target is displayed on the editing screen referenced to by a first editor among the plurality of editors.

(7) A program for causing a computer to function as:

an acquisition section configured to acquire display information for displaying a state of collaborative editing in which a plurality of editors collaboratively edit a same editing target; and a display control section configured to cause an editing screen to display, based on the display information, the state of the collaborative editing performed on a not displayed part not included in a display range displayed when the editing target is displayed on the editing screen referenced to by a first editor among the plurality of editors.

(8) A communication system including:

a plurality of communication terminals manipulated by a plurality of respective editors; and a server apparatus that communicates with the plurality of communication terminals through a network, wherein the server apparatus includes a first acquisition section configured to generate and thereby acquire display information for displaying a state of collaborative editing in which the plurality of editors collaboratively edit a same editing target, and a first display control section configured to control display of each of the communication terminals by transmitting the display information to the communication terminals, and wherein each of the communication terminals includes a second acquisition section configured to receive and thereby acquire the display information supplied from the server apparatus, and a second display control section configured to cause an editing screen to display, based on the acquired display information, the state of the collaborative editing performed on a not displayed part not included in a display range displayed when the editing target is displayed on the editing screen referenced to by a first editor among the plurality of editors.

The above mentioned series of processes can, for example, be executed by hardware or software. In the case where the series of processes is executed by software, a program configuring this software is installed in a computer from a medium recording a program. Here, examples of the computer include a computer incorporated into specialized hardware, and a general-purpose computer which is capable of executing various functions by installing various programs.

[Configuration Example of Computer]

Figure 27:
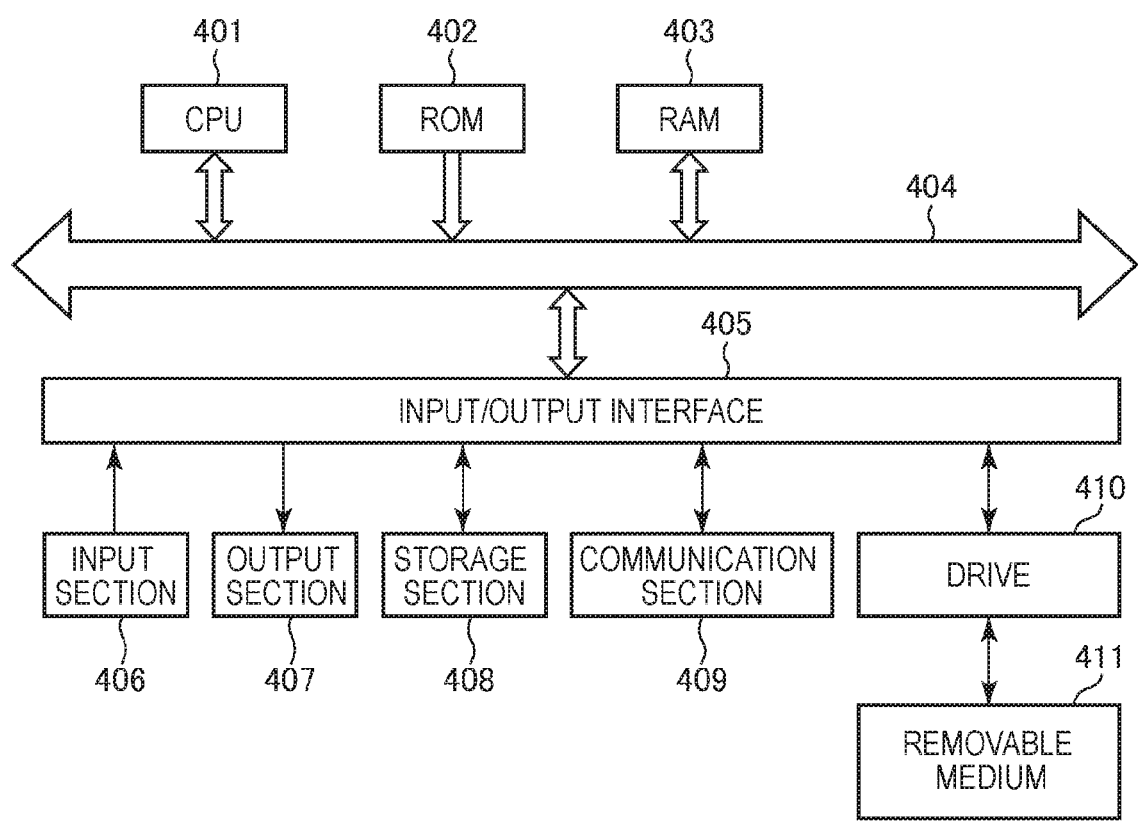
FIG. 27 is a block diagram illustrating a configuration example of a computer.

FIG. 27 illustrates a configuration example of hardware of a computer that executes the above series of processes by programs.

A CPU (Central Processing Unit) 401 executes various processing according to programs stored in a ROM (Read Only Memory) 402 or a storage section 408. The RAM (Random Access Memory) 403 appropriately stores the programs executed by the CPU 401, data, and the like. The CPU 401, the ROM 402, and the RAM 403 are connected to each other through a bus 404.

In addition, an input/output interface 405 is connected to the CPU 401 through the bus 404. An input section 406 and output section 407 are connected to the input/output interface 405, the input section 406 including a keyboard, a mouse, a microphone, and the like, the output section 407 including a display, a speaker, and the like. The CPU 401 executes various processing in accordance with respective instructions input from the input section 406. Then, the CPU 401 outputs the processing result to the output section 407.

The storage section 408 connected to the input/output interface 405 includes, for example, a hard disk, and stores the programs to be executed by the CPU 401 and various data. A communication section 409 communicates with an external apparatus through a network such as the Internet or a local area network.

In addition, programs may be acquired through the communication section 409 and stored in the storage section 408.

A drive 410 is connected to the input/output interface 405. When a removable medium 411 such as a magnetic disk, an optical disk, a magnetic-optical disk, or a semiconductor memory is loaded onto the drive 410, the drive 410 drives the removable medium 411 and acquires programs, data, and the like stored in the removable medium 411. The acquired programs and data are transferred to the storage section 408 as necessary, and are stored in the storage section 408.

The recording medium that records (stores) the program to be installed in the computer and made executable by the computer includes the removable medium 411 which is a package medium including a magnetic disk (including a flexible disk), an optical disk (including a CD-ROM (Compact Disc-Read Only Memory), and a DVD (Digital Versatile Disc)), a magnetic-optical disk (including an MD (Mini-Disc)), a semiconductor memory, and the like; the ROM 402 that temporarily or permanently stores the programs; the hard disk forming the storage section 408; and the like, as illustrated in FIG. 27. The program is recorded in the recording medium as necessary through the communication section 409 which is an interface such as a router or a modem, by utilizing a wired or wireless communication medium such as a local area network, the Internet, or digital satellite broadcast.

In the present specification, steps of describing the above series of processes may include processing performed in time-series according to the described order and processing not processed in time-series but performed in parallel or individually.

In addition, the system in the specification includes a plurality of apparatuses and processing sections, and represents the entirety thereof.

Further, various modifications may occur insofar as they are within the scope of the present disclosure without limitation to the embodiment described above.

REFERENCE SIGNS LIST 1 communication system
$21_1$ to $21_n$ terminal
22 network
23 serer
101 manipulation section
102 generation section
103 communication section
104 display control section
105 display section
121 communication section
122 update section
123 storage section
124 display information generation section

The invention claimed is:

1. An apparatus comprising:
   at least one processor; and
   at least one non-transitory storage device storing processor-executable instructions that, when executed by the at least one processor, cause the apparatus to perform a method, the method comprising:
   acquiring an editing target, the editing target being editable by a plurality of users that includes a first user and a second user;
   acquiring information of an editing type of the second user,
   generating display information for displaying in a display area referenced by the first user based on the information of the editing type of the second user; and
   outputting the display information,
   wherein the display information includes first state information for displaying a state of editing by the second user when the editing type of the second user is a first type,
   wherein the display information includes second state information for displaying a state of editing by the second user when the editing type of the second user is a second type, and
   wherein an amount of display information included in the first state information is more than an amount of display information included in the second state information.

2. The apparatus according to claim 1,
   wherein the first state information comprises an image related to identification information of the second user, and
   wherein the image related to the identification information of the second user comprises one or more selected from a group consisting of a picture, an icon, an avatar, and a composite drawing corresponding to the second user.

3. The apparatus according to claim 1,
   wherein the first state information comprises a cursor corresponding to a position of the second user within the editing target, and
   wherein the cursor comprises a caret.

4. The apparatus according to claim 1,
   wherein the display area includes a first area and a second area.

5. The apparatus according to claim 4,
   wherein the first area includes a first part of the editing target, and
   wherein the first user is capable of editing at least one of text and images displayed in the first part of the editing target included in the first area.

6. The apparatus according to claim 5,
wherein the first state information comprises a cursor corresponding to a position of the second user within the editing target, and
wherein the cursor is displayed in the first area when the second user edits within the first part of the editing target.

7. The apparatus according to claim 6,
wherein the second state information comprises information indicating whether the second user is editing and does not include the cursor.

8. The apparatus according to claim 1,
wherein the display information comprises an image related to identification information of the second user, and
wherein the image related to the identification information of the second user is displayed based on the first state information and is not displayed based on the second state information.

9. The apparatus according to claim 1,
wherein the first state information comprises more detail than the second state information regarding an editing status of the second user.

10. The apparatus according to claim 1,
wherein the first type of editing comprises collaboration and the second type of editing comprises exclusion.

11. The apparatus according to claim 10,
wherein, when the editing type of the second user is the first type, the first user is able to edit within an editing range of the editing target editable by the second user, and
wherein, when the editing type of the second user is the second type, the first user is unable to edit within the editing range editable by the second user.

12. An information processing method, performed via at least one processor, the method comprising:
acquiring an editing target, the editing target being editable by a plurality of users that includes a first user and a second user;
acquiring information of an editing type of the second user,
generating display information for displaying in a display area referenced by the first user based on the information of the editing type of the second user; and
outputting the display information,
wherein the display information includes first state information for displaying a state of editing by the second user when the editing type of the second user is a first type,
wherein the display information includes second state information for displaying a state of editing by the second user when the editing type of the second user is a second type, and
wherein an amount of display information included in the first state information is more than an amount of display information included in the second state information.

13. The method according to claim 12,
wherein the first state information comprises an image related to identification information of the second user, and
wherein the image related to the identification information of the second user comprises one or more selected from a group consisting of a picture, an icon, an avatar, and a composite drawing corresponding to the second user.

14. The method according to claim 12,
wherein the first state information comprises a cursor corresponding to a position of the second user within the editing target, and
wherein the cursor comprises a caret.

15. The method according to claim 12,
wherein the display area includes a first area and a second area.

16. The method according to claim 15,
wherein the first area includes a first part of the editing target, and
wherein the first user is capable of editing at least one of text and images displayed in the first part of the editing target included in the first area.

17. The method according to claim 16,
wherein the first state information comprises a cursor corresponding to a position of the second user within the editing target, and
wherein the cursor is displayed in the first area when the second user edits within the first part of the editing target.

18. The method according to claim 17,
wherein the second state information comprises information indicating whether the second user is editing and does not include the cursor.

19. The method according to claim 12,
wherein the display information comprises an image related to identification information of the second user, and
wherein the image related to the identification information of the second user is displayed based on the first state information and is not displayed based on the second state information.

20. An information processing apparatus comprising:
a processor configured to
acquire an editing target, the editing target being editable by a plurality of users that includes a first user and a second user,
acquire information of an editing type of the second user,
generate display information for displaying in a display area reference by the first user based on the information of the editing type of the second user, and
output the display information,
wherein the display information includes first state information for displaying a state of editing by the second user when the editing type of the second user is a first type,
wherein the display information includes second state information for displaying a state of editing by the second user when the editing type of the second user is a second type, and
wherein an amount of display information included in the first state information is more than an amount of display information included in the second state information.

21. The apparatus according to claim 20,
wherein the first state information comprises an image related to identification information of the second user, and
wherein the image related to the identification information of the second user comprises one or more selected from a group consisting of a picture, an icon, an avatar, and a composite drawing corresponding to the second user.

22. The apparatus according to claim 20,
wherein the first state information comprises a cursor corresponding to a position of the second user within the editing target, and
wherein the cursor comprises a caret.

23. The apparatus according to claim 20,
wherein the display area includes a first area and a second area.

24. The apparatus according to claim 23,
wherein the first area includes a first part of the editing target, and
wherein the first user is capable of editing at least one of text and images displayed in the first part of the editing target included in the first area.

25. The apparatus according to claim 24,
wherein the first state information comprises a cursor corresponding to a position of the second user within the editing target, and
wherein the cursor is displayed in the first area when the second user edits within the first part of the editing target.

26. The apparatus according to claim 25,
wherein the second state information comprises information indicating whether the second user is editing and does not include the cursor.

27. The apparatus according to claim 20,
wherein the display information comprises an image related to identification information of the second user, and
wherein the image related to the identification information of the second user is displayed based on the first state information and is not displayed based on the second state information.

* * * * *